(12) United States Patent
Kato

(10) Patent No.: US 10,481,776 B2
(45) Date of Patent: Nov. 19, 2019

(54) SERVER APPARATUS, CLIENT APPARATUS, INFORMATION PROCESSING METHOD, AND STORAGE MEDIUM

(71) Applicant: CANON KABUSHIKI KAISHA, Tokyo (JP)

(72) Inventor: Yutaka Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 15/789,386

(22) Filed: Oct. 20, 2017

(65) Prior Publication Data

US 2018/0121066 A1    May 3, 2018

(30) Foreign Application Priority Data

Oct. 28, 2016    (JP) ................................ 2016-212171

(51) Int. Cl.
*G06F 3/0484* (2013.01)
*G06F 3/0488* (2013.01)
*G06F 17/24* (2006.01)

(52) U.S. Cl.
CPC ...... *G06F 3/04845* (2013.01); *G06F 3/04883* (2013.01); *G06F 17/243* (2013.01)

(58) Field of Classification Search
CPC . G06F 3/04845; G06F 3/04883; G06F 17/243
See application file for complete search history.

(56) References Cited

U.S. PATENT DOCUMENTS

| 8,370,733 B2 | 2/2013 | Kato ............................ 715/217 |
| 9,508,170 B2 | 11/2016 | Kashibuchi et al. |
| 2008/0082909 A1* | 4/2008 | Zuverink .............. G06F 3/0481 715/224 |
| 2013/0235087 A1 | 9/2013 | Kashibuchi et al. |
| 2015/0277714 A1* | 10/2015 | Wang .................. G06F 3/04845 715/767 |
| 2015/0277715 A1* | 10/2015 | Wang .................. G06F 3/04845 345/661 |
| 2016/0259772 A1 | 9/2016 | Kato ..................... G06F 17/243 |
| 2017/0032493 A1 | 2/2017 | Kashibuchi et al. |
| 2017/0154023 A1 | 6/2017 | Kato ..................... G06F 17/243 |
| 2018/0121066 A1* | 5/2018 | Kato ................... G06F 3/04845 |
| 2018/0276194 A1* | 9/2018 | Padgett ............... G06F 3/04895 |

FOREIGN PATENT DOCUMENTS

JP    2013-190870    9/2013

* cited by examiner

*Primary Examiner* — David E Choi
(74) *Attorney, Agent, or Firm* — Venable LLP

(57) ABSTRACT

The server apparatus according to an embodiment of the present invention improves convenience of a user while suppressing an increase of the load to enlarge a specific area within a business form page. The server apparatus includes a saving unit configured to save business form part information on a business form page, which includes information on a focus area to enlarge a specific area within the business form page. Further, the server apparatus includes a transmission unit configured to transmit the business form part information relating to a request to a client apparatus in response to the request from the client apparatus that displays the business form page. Based on the information on a focus area included in the business form part information, the specific area is enlarged on the client apparatus.

11 Claims, 31 Drawing Sheets

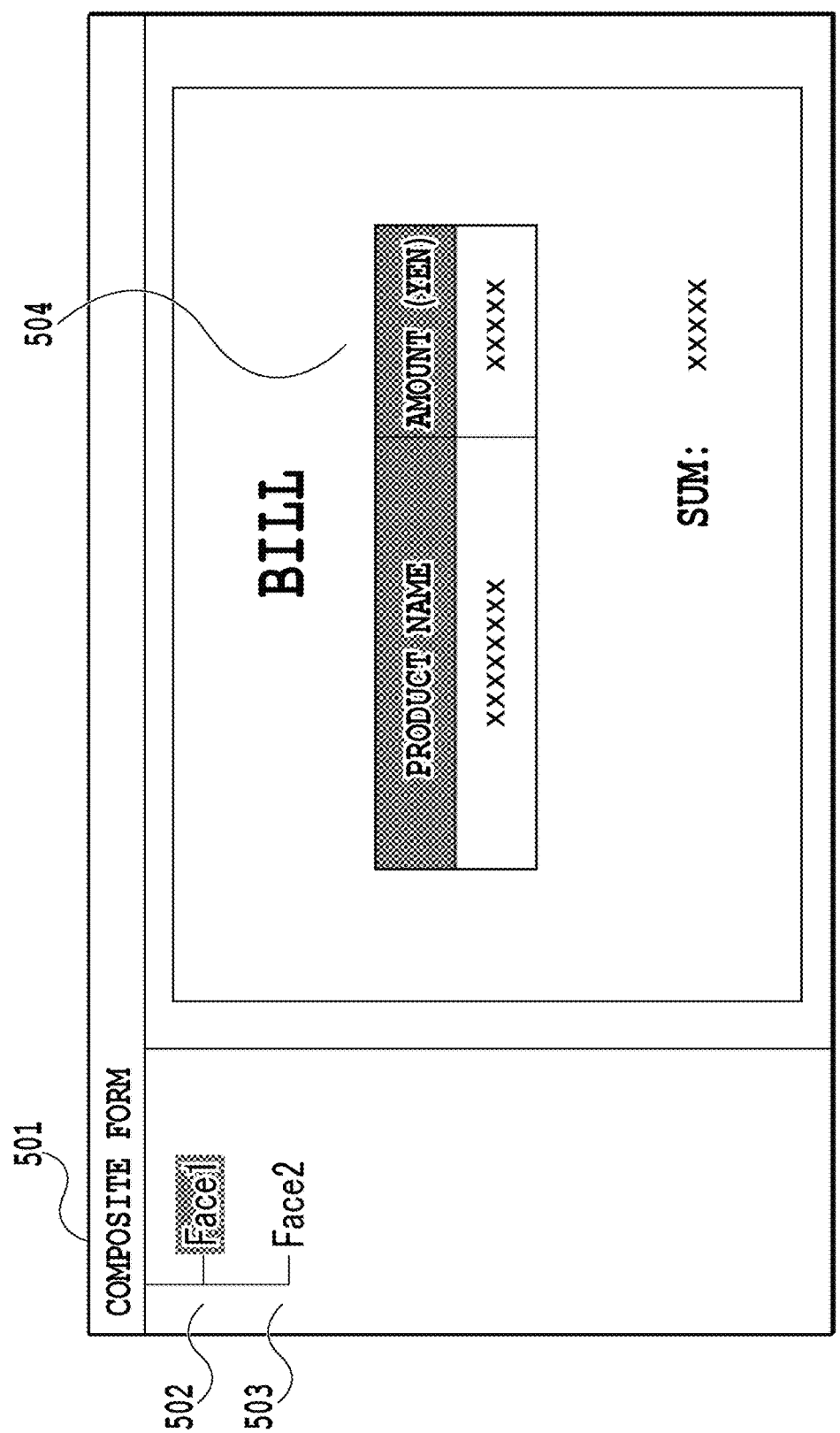

FIG.19

WEB BUSINESS FORM BROWSE SCREEN — 1901

1902 — BILL

DAY OF ISSUE 15 JULY, 2016

1-1-1, CHIYODA, CHIYODA-KU,
TOKYO, 123-4567
TO: DISCOUNT STORE KAN-NON

100347

AAAAA CO., LTD.
1-1-1, CHIYODA, CHIYODA-KU, TOKYO, 123-4567
Tel. 012-345-6789  FAX. 012-345-6789

AMOUNT BILLED  93,240YEN (TAX INCLUDED)
CONSUMPTION TAX  4,440YEN

DEAR SIRS
THANK YOU FOR USING OUR COMPANY.
NOW YOU WILL BE CHARGED FOR THE FOLLOWING AMOUNT. WE WOULD ASK YOU TO
TRANSFER THE AMOUNT INTO OUR ACCOUNT DESCRIBED BELOW BY 22 JULY.
THE EB BANK, THE TOKYO BRANCH, THE ORDINARY ACCOUNT 1234567, AAAAA CO., LTD.

PERIOD BILLED  1 MAY TO 31 MAY

DETAILED STATEMENT — 1903

| DAY OF DELIVERY | CATEGORY | PRODUCT NAME | UNIT PRICE (YEN) | QUANTITY | AMOUNT (YEN) |
|---|---|---|---|---|---|
| 05/01 | | APPLE JUICE | 100 | 20 | 2,000 |
| | | ORANGE JUICE | 100 | 20 | 2,000 |
| | 350 CANS | GRAPE FRUIT JUICE | 100 | 20 | 2,000 |
| | | MIX JUICE | 100 | 20 | 2,000 |
| | | CAFE AU LAIT | 90 | 20 | 1,800 |
| | | ORANGE JUICE | 120 | 20 | 2,400 |
| | 500mlPet | GRAPE FRUIT JUICE | 120 | 20 | 2,400 |
| | | MIX JUICE | 110 | 20 | 2,200 |
| | | SPORTS DRINK | | | |

1904

| DAY OF DELIVERY | CATEGORY | PRODUCT NAME | UNIT PRICE (YEN) | QUANTITY | AMOUNT (YEN) |
|---|---|---|---|---|---|
| 05/01 | | APPLE JUICE | 250 | 10 | 2,500 |
| | | GRAPE FRUIT JUICE | 250 | 10 | 2,500 |
| | 1.5LPet | MIX JUICE | 250 | 10 | 2,500 |
| | | ORANGE JUICE | 250 | 10 | 2,500 |
| | | COOKIE BOX | 350 | 30 | 10,500 |
| | CONFECTIONARY | CHOCOLATE MINI | 150 | 30 | 4,500 |
| | | CANDY | 150 | 20 | 3,000 |
| | | SUB TOTAL | | | 47,200 |
| 05/07 | | APPLE JUICE | 100 | 30 | 3,000 |
| | | ORANGE JUICE | 100 | 30 | 3,000 |
| | 350 CANS | GRAPE FRUIT JUICE | 100 | 30 | 3,000 |
| | | COFFEE | 90 | 50 | 4,500 |
| | | CAFE AU LAIT | 90 | 20 | 1,800 |
| | | ORANGE JUICE | 120 | 20 | 2,400 |
| | 500mlPet | MIX JUICE | 120 | 20 | 2,400 |
| | | SPORTS DRINK | 110 | 20 | 2,200 |
| | | ORANGE JUICE | 250 | 10 | 2,500 |
| | 1.5LPet | GRAPE FRUIT JUICE | 250 | 10 | 2,500 |
| | | MIX JUICE | 250 | 20 | 5,000 |
| | | SPORTS DRINK | 200 | 10 | 2,000 |
| | CONFECTIONARY | CHOCOLATE MINI | 150 | 10 | 1,500 |
| | | CANDY | 130 | 10 | 1,300 |
| | | SUB TOTAL | | | 37,100 |
| 05/14 | | | 100 | 20 | 2,000 |
| | | | 100 | 20 | 2,000 |
| | | | | | 4,000 |
| | | SUB TOTAL | | | |
| | | SUM OF THIS MONTH | | | 88,800 |

— END —

WEB BUSINESS FORM BROWSE SCREEN — 2101

BILL
DAY OF ISSUE 15 JULY, 2016

1-1-1, CHIYODA, CHIYODA-KU,
TOKYO, 123-4567

TO: DISCOUNT STORE KAN-NON          100347

AAAAA CO., LTD.
1-1-1, CHIYODA, CHIYODA-KU, TOKYO, 123-4567
Tel. 012-345-6789 FAX. 012-345-6789

DEAR SIRS,
THANK YOU FOR USING OUR COMPANY.
NOW YOU WILL BE CHARGED FOR THE FOLLOWING AMOUNT. WE WOULD ASK YOU TO
TRANSFER THE AMOUNT INTO OUR ACCOUNT DESCRIBED BELOW BY 27 JULY.
THE BB BANK, THE TOKYO BRANCH, THE ORDINARY ACCOUNT 1234567, AAAAA CO., LTD.

PERIOD BILLED          AMOUNT BILLED

1 MAY TO 31 MAY        93,240YEN (TAX INCLUDED)
                       CONSUMPTION TAX 4,440YEN

WEB BUSINESS FORM BROWSE SCREEN

DETAILED STATEMENT

| DAY OF DELIVERY | CATEGORY | PRODUCT NAME | UNIT PRICE (YEN) | QUAN-TITY | AMOUNT (YEN) |
|---|---|---|---|---|---|
| 05/01 | 350 CANS | APPLE JUICE | 100 | 20 | 2,000 |
| | | ORANGE JUICE | 100 | 20 | 2,000 |
| | | GRAPE FRUIT JUICE | 100 | 20 | 2,000 |
| | | MIX JUICE | 100 | 20 | 2,000 |
| | | CAFE AU LAIT | 90 | 20 | 1,800 |
| | 500mlPet | ORANGE JUICE | 120 | 20 | 2,400 |
| | | GRAPE FRUIT JUICE | 120 | 20 | 2,400 |
| | | MIX JUICE | 120 | 20 | 2,400 |
| | | SPORTS DRINK | 110 | 20 | 2,200 |

SERVER APPARATUS, CLIENT APPARATUS, INFORMATION PROCESSING METHOD, AND STORAGE MEDIUM

BACKGROUND OF THE INVENTION

Field of the Invention

The present invention relates to a technique to browse a business form page.

Description of the Related Art

Conventionally, as a creation method of a business form, there is a method as follows. First, a form, which is the prototype of a business form, is created in advance by using a dedicated application to edit a form. Next, by overlaying the form with field data (applying corresponding field data by pouring the field data into each field within the form), a business form page (for example, a file in the PDF format) is generated and then the business form page is printed. In this method, for example, a server apparatus generates a business form page by performing overlay output processing and a client apparatus receives the business form page from the server apparatus, and displays and/or prints the business form page.

Generally, in most cases, a business form page is generated from a form originally designed for printing. For example, an insurance business form that a life insurance company creates to explain an insurance plan to a client is the A3 size in many case and the configuration of the insurance business form premises that the insurance business form is printed on an A3 sheet and then explanation is given to a client. The size of the character font is designed based on this premise, and therefore, a small size font, for example, such as a 9-point font, is used in many cases. On the other hand, aiming at saving resources of paper, such operation is also considered in which at the time of explanation to a client, explanation is given by displaying the business form page on a tablet device, such as iPad (registered trademark), and then, only the necessary business form page is printed. However, the screen size and the screen resolution of the tablet device are small and low compared to those of the A3 sheet. Because of this, in the case where the entire business form created on the premise of printing is displayed on the tablet device, the characters and the like are very small and difficult to see. Consequently, at the time of browsing such a business form on the tablet device, it is necessary for a user to perform a pinch operation by extending the interval between two fingers to enlarge the business form page, and therefore, the user operation takes time and effort.

Japanese Patent Laid-Open No. 2013-190870 has disclosed a technique to recognize objects (partial areas) within image data of a document read by a scanner and the like and to sequentially display each partial area at the time of browsing the document image.

However, the technique disclosed in Japanese Patent Laid-Open No. 2013-190870 takes image data of a document as a processing target, and therefore, it is necessary to specify an object by performing object recognition processing for image data of each page of the document. Consequently, in the case where an attempt is made to browse business form data by using the technique disclosed in Japanese Patent Laid-Open No. 2013-190870, after the business form data is temporarily converted into a bitmap image, the object recognition processing is performed for the bitmap image. Because of this, in the case where the object recognition processing is performed by performing bitmap conversion processing for a plurality of business form pages generated by the overlay output processing each time a business form page is generated, the load of the processing becomes heavy. Further, in the case where an object is erroneously recognized, a fine adjustment operation is necessary each time of erroneous recognition, and therefore, the load of a user also becomes heavy.

Consequently, an object of the present invention is to provide a server apparatus, a client apparatus, an information processing method, and a storage medium storing a program, which can improve convenience of a user while suppressing an increase of the load imposed by enlarging a specific area within a business form page.

SUMMARY OF THE INVENTION

The server apparatus according to an embodiment of the present invention includes: a saving unit configured to save business form part information on a business form page, which includes information on a focus area to enlarge a specific area within the business form page; and a transmission unit configured to transmit the business form part information relating to a request to a client apparatus in response to the request from the client apparatus that displays the business form page. Based on the information on a focus area included in the business form part information, the specific area is enlarged on the client apparatus.

Further features of the present invention will become apparent from the following description of exemplary embodiments with reference to the attached drawings.

BRIEF DESCRIPTION OF THE DRAWINGS

FIG. 5A and FIG. 5B are diagrams explaining a composite form of the first embodiment;

FIG. 19 is a diagram showing an example of the Web business form browse screen of the first embodiment;

FIG. 21 is a diagram showing a state where a focus area on the Web business form browse screen of the first embodiment is enlarged;

FIG. 22 is a diagram showing a state where a focus area on the Web business form browse screen of the first embodiment is enlarged;

FIG. 24 is a diagram showing an example of a Web form editing screen of the second embodiment;

DESCRIPTION OF THE EMBODIMENTS

In the following, with reference to the drawings, embodiments according to the present invention are explained in detail. Throughout the drawings, the same symbol indicates the same component.
(First Embodiment)

Figure 1:
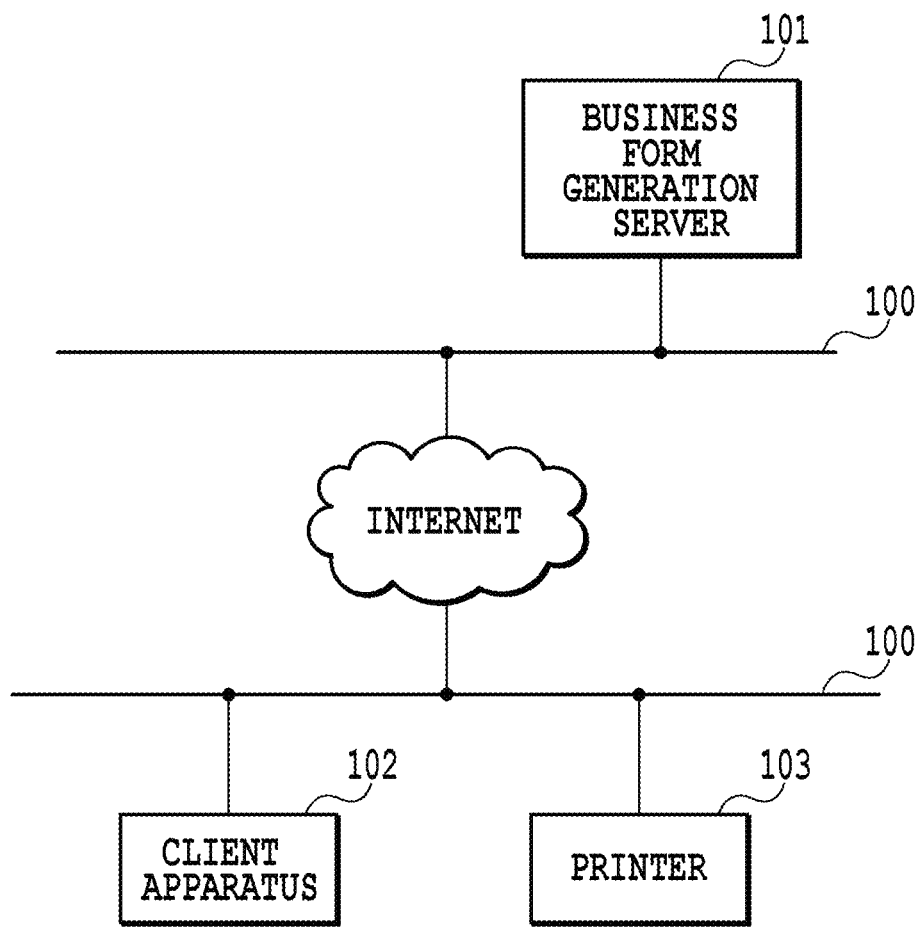
FIG. 1 is a diagram showing a system configuration example of a first embodiment.

FIG. 1 is a diagram showing a system configuration example of the present embodiment.

The system shown in FIG. 1 includes a business form generation server (server apparatus) 101, a client apparatus 102, and a printer 103 connected via a network 100 so as to be capable of communication with one another.

The business form generation server 101 is an information processing apparatus of the present embodiment and performs overlay output processing of a business form page. That is, the business form generation server 101 generates a business form page by overlaying field data, which is text data, and a predetermined form and outputs the business form page generated by giving instructions to a virtual printer as a business form file in the electronic file format. The overlay output processing will be described later with reference to FIG. 4.

Further, the business form generation server 101 performs processing to generate a Web business form browse program to control browsing of a business form file in the electronic file format and a Web form editing program to control layout editing of a business form file. The Web business form browse program and the Web form editing program of the present embodiment are Web applications that are distributed to the client apparatus via the network and which run on a Web browser of the client apparatus. In general, these Web applications are applications that run by the mashup language (HTML) that represents a Web page and the programming language (JavaScript) that runs on the Web browser. The Web business form browse program is an application that displays a business form file in the electronic file format on the Web browser and causes a user to perform browsing, and therefore, in the following, the Web business form browse program is also called a Web business form browse screen. The Web business form browse program may not be a Web application that runs on the Web browser and for example, may be an application that is executed on a computer system. It may also be possible for the business form generation server 101 to generate a business form file and a file including overlay information, to be described later, and for the client apparatus 102 to include an application capable of implementing Web business form browse and Web form editing operations, to be described later, by using the files. The Web form editing program (Web form editing screen) will be described later.

The above-described overlay output processing, Web business form browse program generation processing, and Web form editing program generation processing by the business form generation server 101 are performed by receiving a request from the client apparatus 102. Further, the business form generation server 101 performs an information processing method relating to a sequence and a flowchart to be is explained in the following with reference to the drawings.

The printer 103 receives a request from the client apparatus 102 and performs processing to print a business form file on paper.

The network 100 is, for example, the Internet, LAN, WAN, telephone line, dedicated digital line, ATM or frame relay line, cable TV line, data broadcast wireless line, and so on. Further, the network 100 may be implemented by a combination of those. That is, the network 100 is only required to have a network configuration in which data can be transmitted and received. The communication unit from the client apparatus 102 to the business form generation server 101 may be different from the communication unit from the client apparatus 102 to the printer 103.

Figure 2:
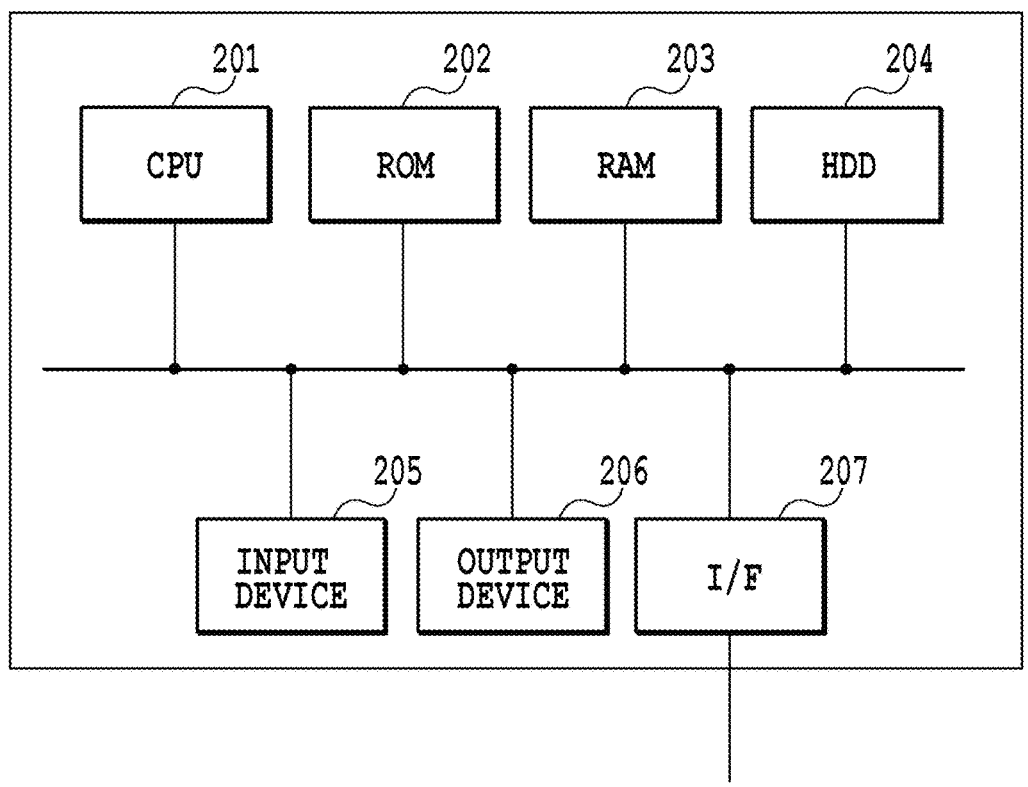
FIG. 2 is a diagram showing a hardware configuration example of a business form generation server and a client apparatus of the first embodiment.

FIG. 2 is a block diagram showing a hardware configuration of devices that implement the business form generation server 101 and the client apparatus 102.

A CPU 201 directly or indirectly controls each device (ROM, RAM, and so on, to be described later) connected by an internal bus and executes programs to implement the present invention.

A ROM 202 stores a BIOS.

A RAM 203 is a direct storage device that is utilized as a work area of the CPU 201, utilized as a temporary storage device to load software modules to implement the present invention, and so on.

An HDD (Hard Disk Drive) 204 is an indirect storage device that stores an OS, which is basic software, and software modules. The HDD 204 may be an SSD (Solid State Drive) and the like.

An input device 205 is a keyboard, a pointing device, and so on, not shown schematically.

An output device 206 is a display and the like.

An I/F (interface) 207 is used to connect to the network 100.

In the above-described hardware configuration, in the case where the apparatus activates, the BIOS is executed by the CPU 201 and the OS is loaded from the HDD 204 onto the RAM 203 so that the OS can be executed. The CPU 201 loads various software modules, to be described later, in accordance with the operation of the OS from the HDD 204 onto the RAM 203 at any time so that the software modules can be executed. The various software modules are executed and run by the CPU 201 in cooperation of each of the above-described devices. The I/F 207 is connected to the network 100, controlled by the CPU 201 in accordance with the operation of the OS, and implements communication by the above-described communication unit.

Figure 3:
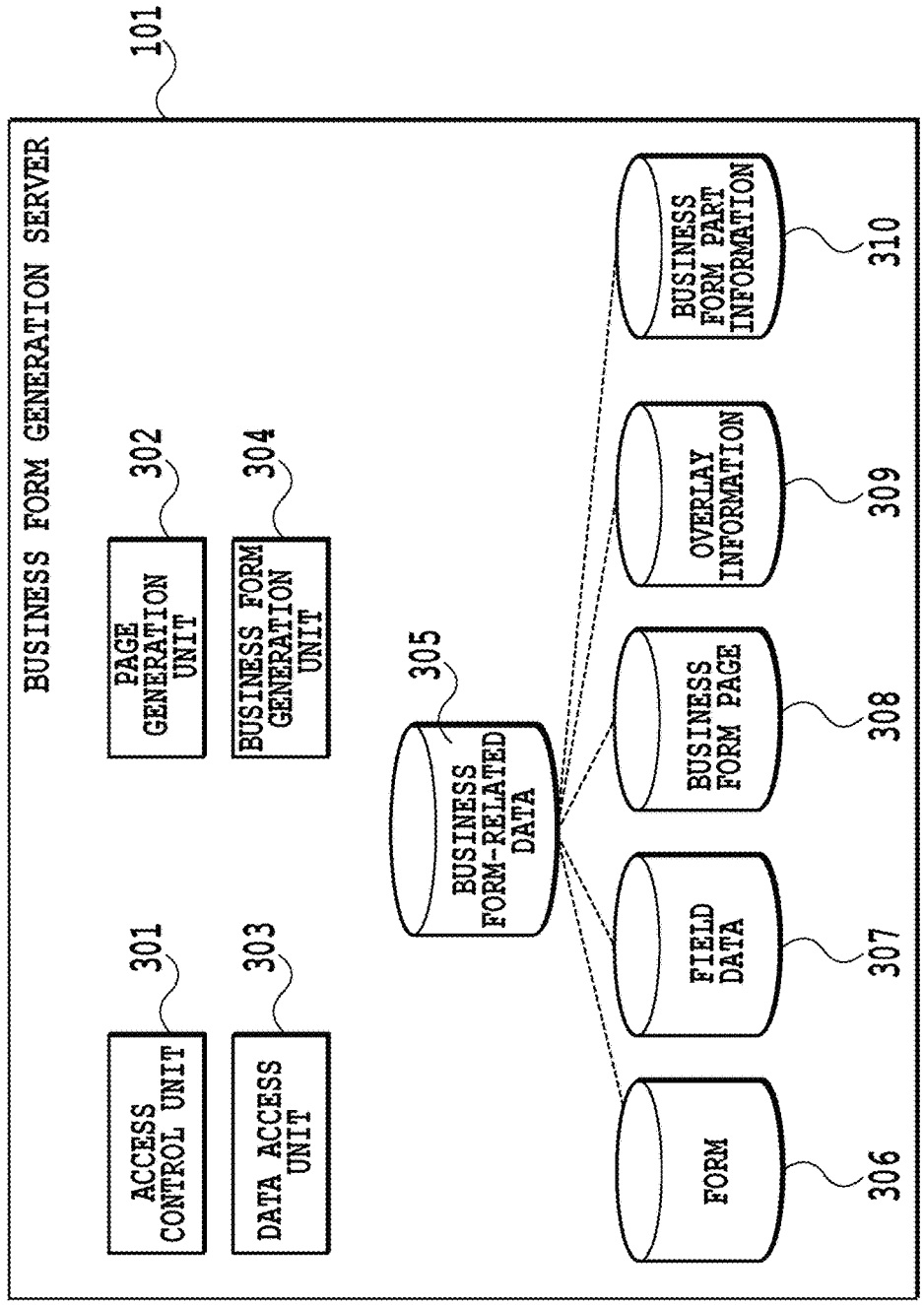
FIG. 3 is a diagram showing a configuration example of software modules that run on the business form server of the first embodiment.

FIG. 3 is a diagram showing a configuration example of software modules that run on the business form generation server 101. Each software module is stored in the HDD 204 shown in FIG. 2 and loaded onto the RAM 203 and executed by the CPU 201 as described previously.

An access control unit 301 performs user authentication in response to a request from the client apparatus 102.

A page generation unit 302 generates a Web page that is returned to the client apparatus 102 as a response. Further, files, such as HTML and JavaScript, necessary for the above-described Web applications are also generated by the page generation unit 302 and transmitted to the client apparatus 102.

A data access unit 303 performs processing to access various databases 305, 306, 307, 308, 309, and 310, to be described later.

A business form generation unit 304 generates a business form page by overlaying the form of the business form page read via the data access unit 303 and the field data. Further, the business form generation unit 304 generates a business form file in the electronic file format by utilizing software, such as a virtual printer, from the generated business form page.

The database 305 stores business form-related data representing information relating to a business form, such as a business form name and an owner name. Further, the database 305 manages the business form, the form, the field data, and business form part information, to be described later, in association with one another. Furthermore, the database 305 manages the business form, the business form page, which is the results of the overlay output processing, and overlay information, to be described later, in association with one another. It is possible for the business form generation server 101 to specify, for example, the form in which a certain business form page is generated and business form part information in relation to the form by utilizing the database 305.

The database 306 stores form information. The database 307 stores field data. The database 308 stores a business form page generated by the business form generation unit 304. The database 309 stores overlay information that is generated at the time of overlay output processing, to be described later. The database 310 stores business form part information, to be described later.

Next, the overlay output processing that is performed by the business form generation server 101 is explained.

The overlay output processing is to perform printing by overlaying a form recording information, such as a frame line in the document sheet format, and data in the text format (field data). The results of the overlay output processing may be output as an electronic file, not on paper.

Figure 4:
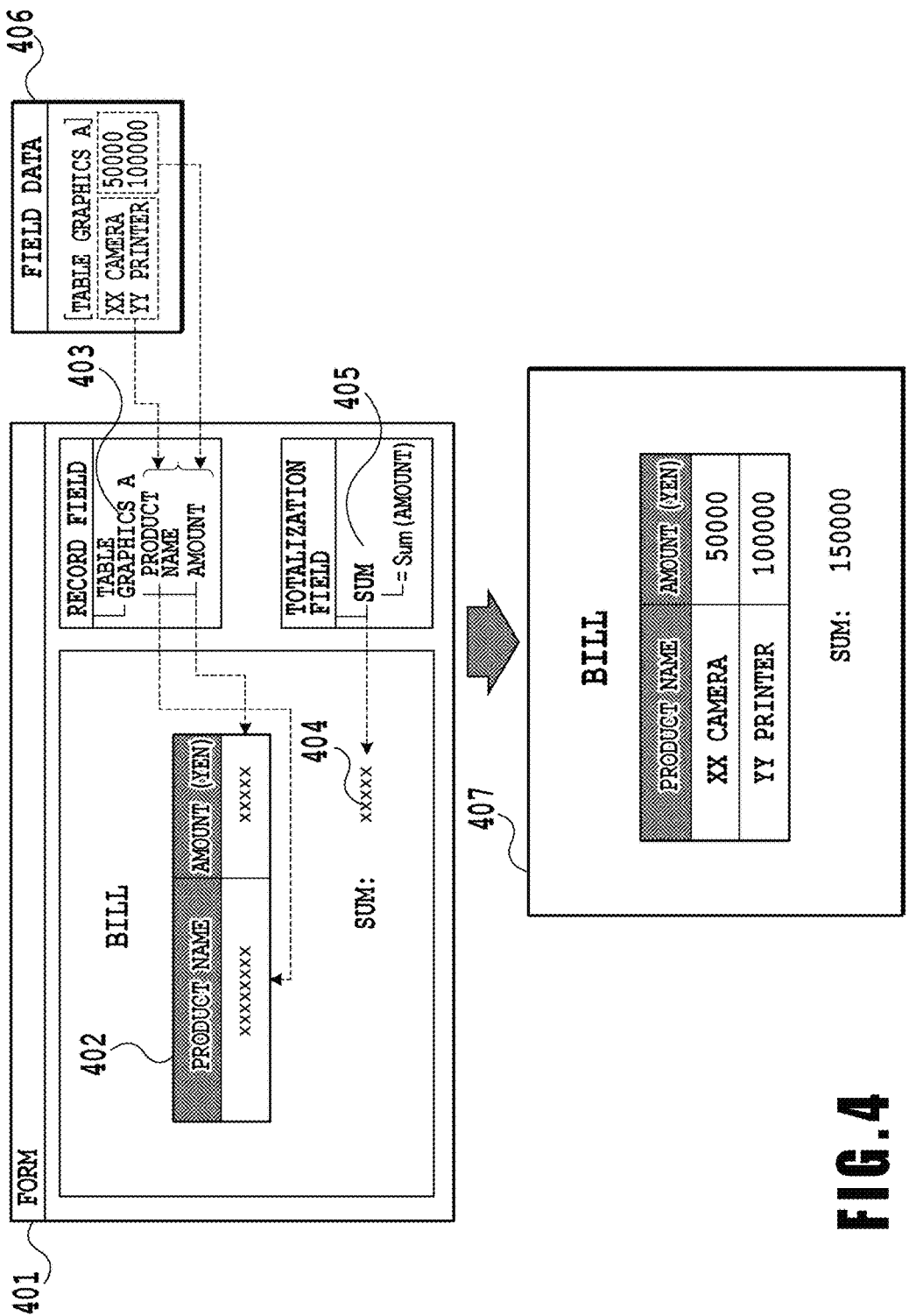
FIG. 4 is a diagram explaining an outline of overlay output processing by the business form generation server of the first embodiment.

FIG. 4 is a diagram explaining an outline of the overlay output processing by the business form generation server 101.

Form 401 is created by utilizing a dedicated form design system and may be saved as a file. In general, Form 401 is made up of a fixed graphics (form graphics), which does not depend on Field data 406, and a graphics (field graphics) that displays received Field data 406 in accordance with a specified output format. In order to create a field graphics, it is necessary to create in advance an item (field) to receive Field data 406. It is possible to create a field from a dedicated screen displayed in the form design system. After the field graphics is created, association with the field, which is the source of creation, is performed internally.

In the case of a field graphics (table graphics) 402 in the table format, it is necessary to create Record field 403 because it is necessary to receive Field data 406 in units of records.

The field in the format that generates field data from calculation results of data of another field graphics is defined as a calculation column field. Further, the field format that generates field data by performing totalization by a specified totalization method is defined as Totalization field 405. In the case of a field graphics 404, it is necessary to create Totalization field 405 in order to indicate which field and which totalization method are specified.

The business form generation server 101 reads Form 401 in which the field graphics is defined and corresponding Field data 406. Then, the business form generation server 101 performs the overlay output processing by overlaying read Form 401 and Field data 406 and generates overlay output processing results 407.

Figure 5B:
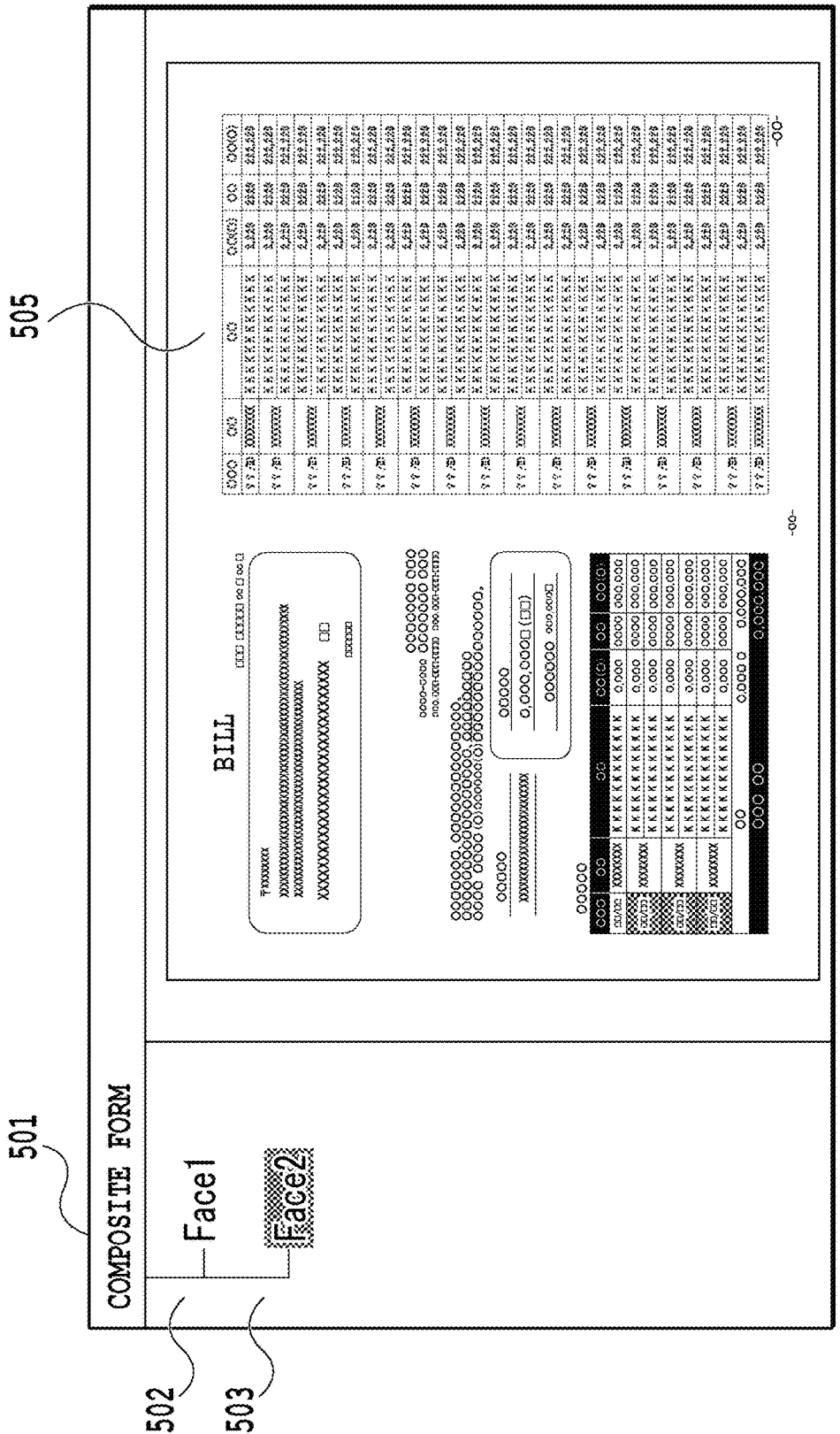

FIG. 5A and FIG. 5B are diagrams explaining a composite form.

Composite form 501 is a form that puts together information to output a plurality of forms as one business form file. Due to Composite form 501, it is made possible to output a business form while switching a plurality of forms. It is possible to create Composite form 501 by utilizing a dedicated form design system and to save as a file. In Composite form 501, utilizing a plurality of forms is defined (face names 502 and 503). Each form defined in Composite form 501 is called "face". Each face has a name (face name) unique within Composite form 501 (face name 502 is "Face1", face name 503 is "Face2"). Although details will be described later, the face names 502 and 503 are utilized at the time of specifying a face into which data is poured within the field data. It is possible for a user to check each defined form on the screen by operating the form design system. For example, as in FIG. 5A, in the case where a user selects Face1, the face name 502 in a face list tree on the left pane is highlighted and it is explicitly indicated that the face name 502 is being selected. At this time, on the right pane, a form 504 that is the contents of Face1 is displayed. Following this, in the case where a user selects Face2 as in FIG. 5B, the face name 503 is similarly highlighted on the left pane and on the right pane, a form 505 that is the contents of Face2 is displayed. In the form design system, it is also possible to further move into editing of the form that is the contents of the selected face in the state where a user selects the face.

Figure 6:
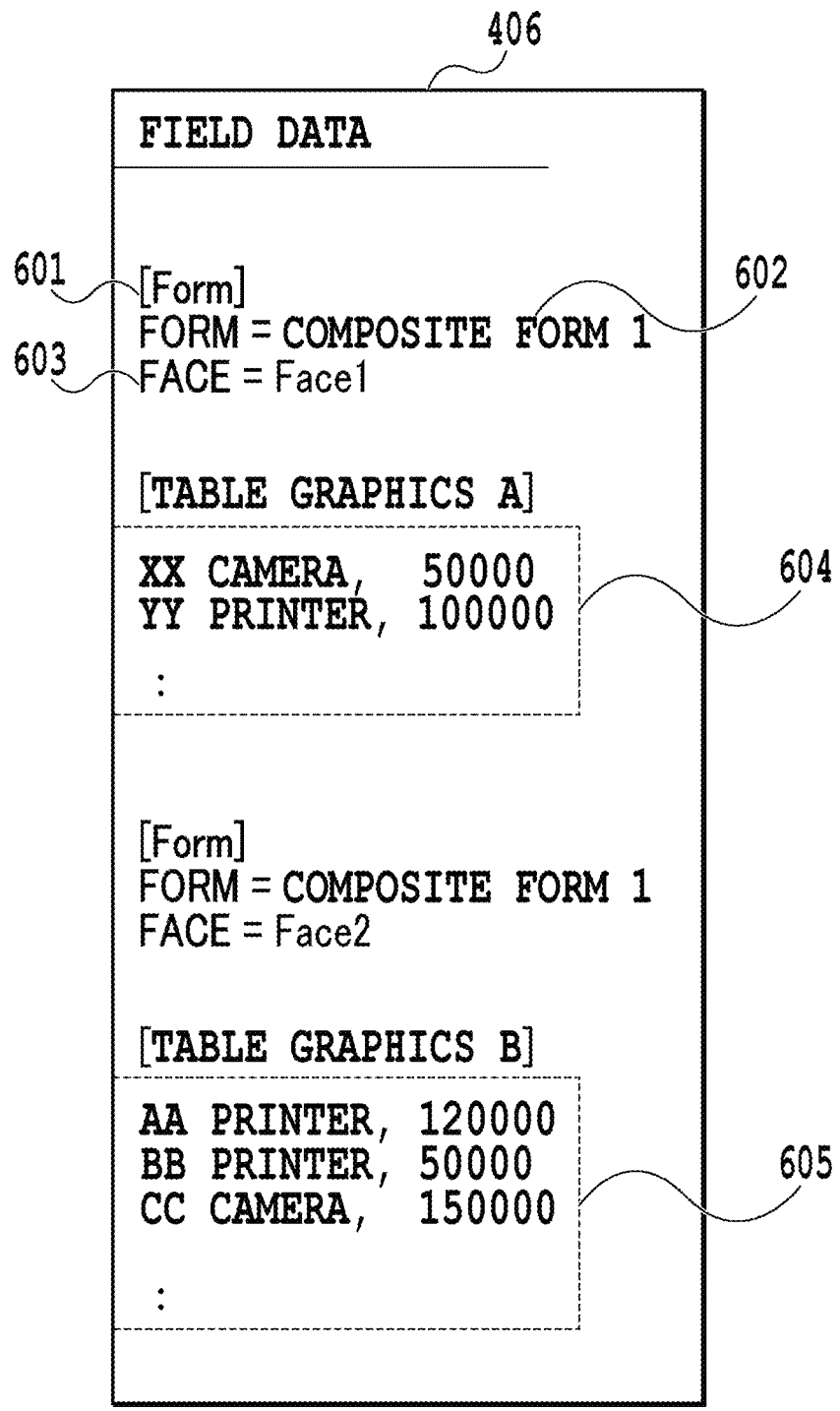
FIG. 6 is a diagram showing an example of field data corresponding to the composite form of the first embodiment.

FIG. 6 is an example of Field data 406 to be poured into the above-described composite form.

In a form-related definition 601, a form switch command 602 and a face switch command 603 are defined. At the time of the business form generation server 101 reading Field data 406, the form-related definition 601 is read, each command is interpreted, and the form and the face into which data is poured are specified. In Field data 406 in FIG. 6, into Table graphics A defined in the form of "Face1" of "Composite form 1", a data block 604 is poured. Further, following this, into Table graphics B defined in the form of "Face2" of "Composite form 1", a data block 605 is poured. In this manner, the composite form and Field data 406 that is poured thereinto are overlaid and one business form file is generated.

Next, the specific operation of the business form generation server 101 and the client apparatus 102 in the present embodiment is explained.

Figure 7:
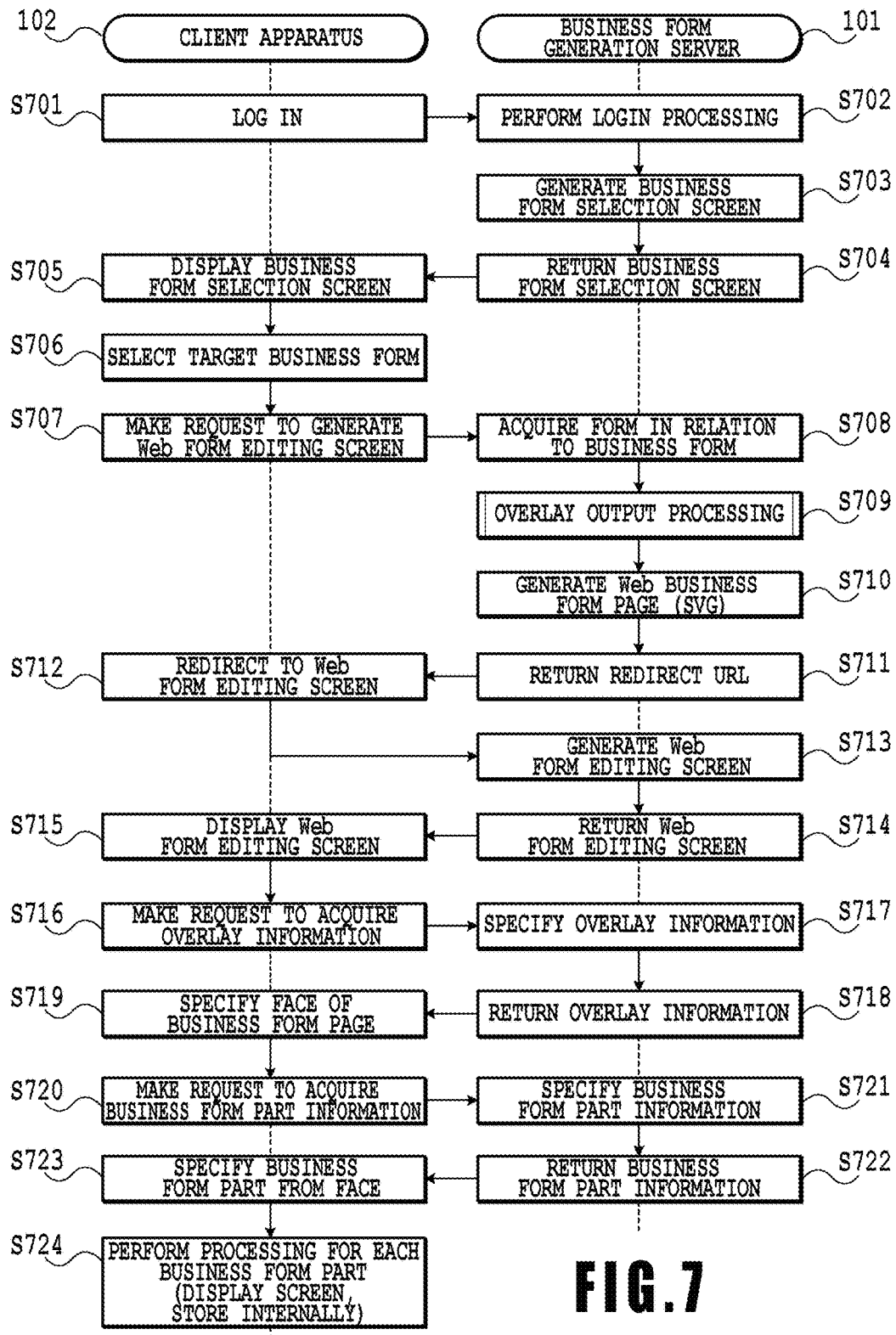
FIG. 7 is a diagram showing a sequence of processing to generate a Web form editing screen of the first embodiment.

FIG. 7 is a diagram showing a sequence of processing to generate a Web form editing screen in the present embodiment.

Figure 8:
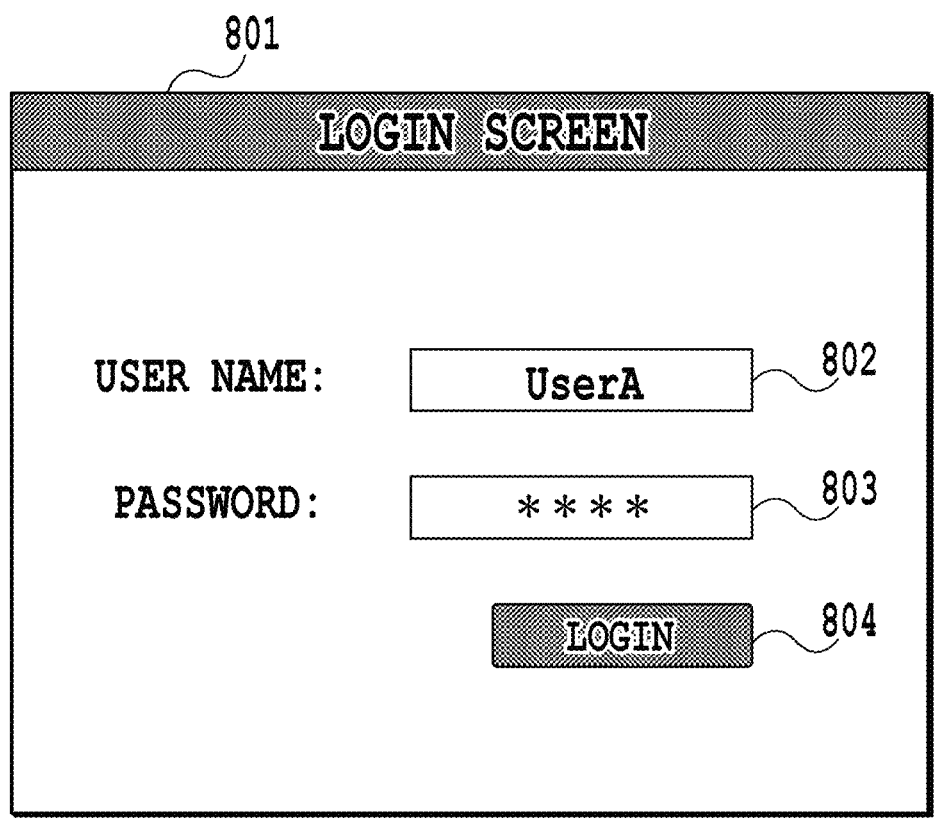
FIG. 8 is a diagram showing an example of a login screen of the first embodiment.

At step S701, the client apparatus 102 transmits a login request to the business form generation server 101 in accordance with user instructions that are input on Login screen 801 shown in FIG. 8, which is displayed on the Web browser of the client apparatus 102. The client apparatus 102 transmits a login request to the business form generation server 101 in the case where a user name is input to a User name input box 802 and a password is input to a Password input box 803 and a Login button 804 is pressed down on Login screen 801.

At step S702, the access control unit 301 of the business form generation server 101 performs login processing in response to the login request received from the client apparatus 102. The access control unit 301 performs Basic authentication and in the case of determining that the user name and the password are valid, the processing advances to step S703. The Basic authentication is common authentication processing, and therefore, explanation thereof is omitted.

Figure 9:
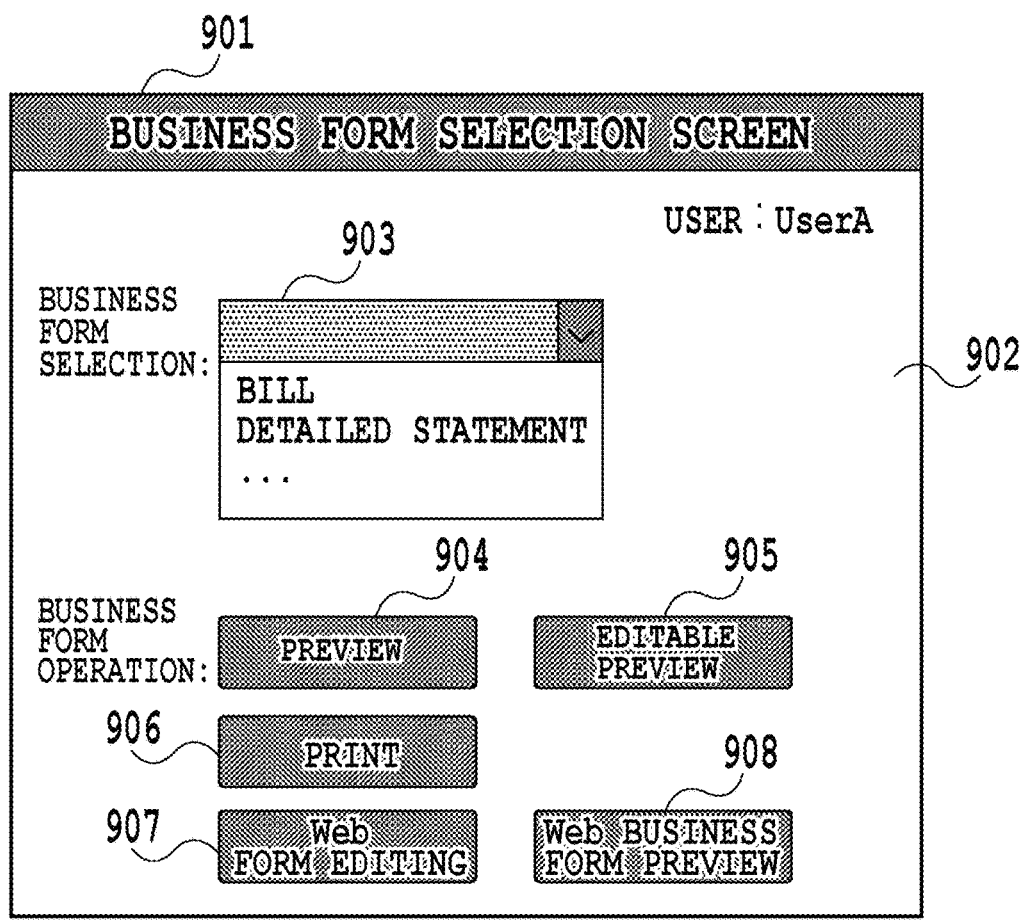
FIG. 9 is a diagram showing an example of a business form selection screen of the first embodiment.

At step S703, the page generation unit 302 of the business form generation server 101 generates Business form selection screen 901 shown in FIG. 9 in accordance with information on a user who has logged in.

On Business form selection screen 901, an area 902 displays the user name of a currently logged-in user. A dropdown list 903 selectably displays a list of business forms possessed by the currently logged-in user. The contents displayed in the dropdown list 903 are business form names of the business forms possessed by the user who had logged in, which are extracted from the database 305 of the business form-related data by the page generation unit 302 via the data access unit 303.

Operation buttons 904, 905, 906, 907, and 908 are buttons to perform. Preview, Editable preview, Print operation, Web form editing, and Web business form preview for the business form corresponding to the business form name selected in the dropdown list 903. The processing after the Web form editing button 907 and the Web business form preview button 908 are pressed down will be described later, but explanation of the processing after the Preview button 904, the Editable preview button 905, and the Print button 906 are pressed down is omitted.

Returning to the explanation in FIG. 7, at step S704, the access control unit 301 of the business form generation server 101 returns Business form selection screen 901 generated at step S703 to the client apparatus 102 via the network 100.

At step S705, the client apparatus 102 receives Business form selection screen 901 received as a response from the business form generation server 101 and displays Business form selection screen 901 on the Web browser.

At step S706, the client apparatus 102 receives the business form name of the operation-target business form selected by a user from the dropdown list 903 within Business form selection screen 901.

At step S707, the client apparatus 102 transmits a request to generate a Web form editing screen of the selected business form to the business form generation server 101 by pressing down the Web form editing button 907 within Business form selection screen 901. The request to generate a Web form editing screen includes information that can specify the operation-target (that is, editing-target) business form.

At step S708, the business form generation unit 304 of the business form generation server 101 acquires a form in relation to the editing-target business form via the data access unit 303.

At step S709, the business form generation unit 304 of the business form generation server 101 performs the overlay output processing by using the form acquired at step S708.

In the following, the operation of the overlay output processing is explained in detail.

Figure 10:
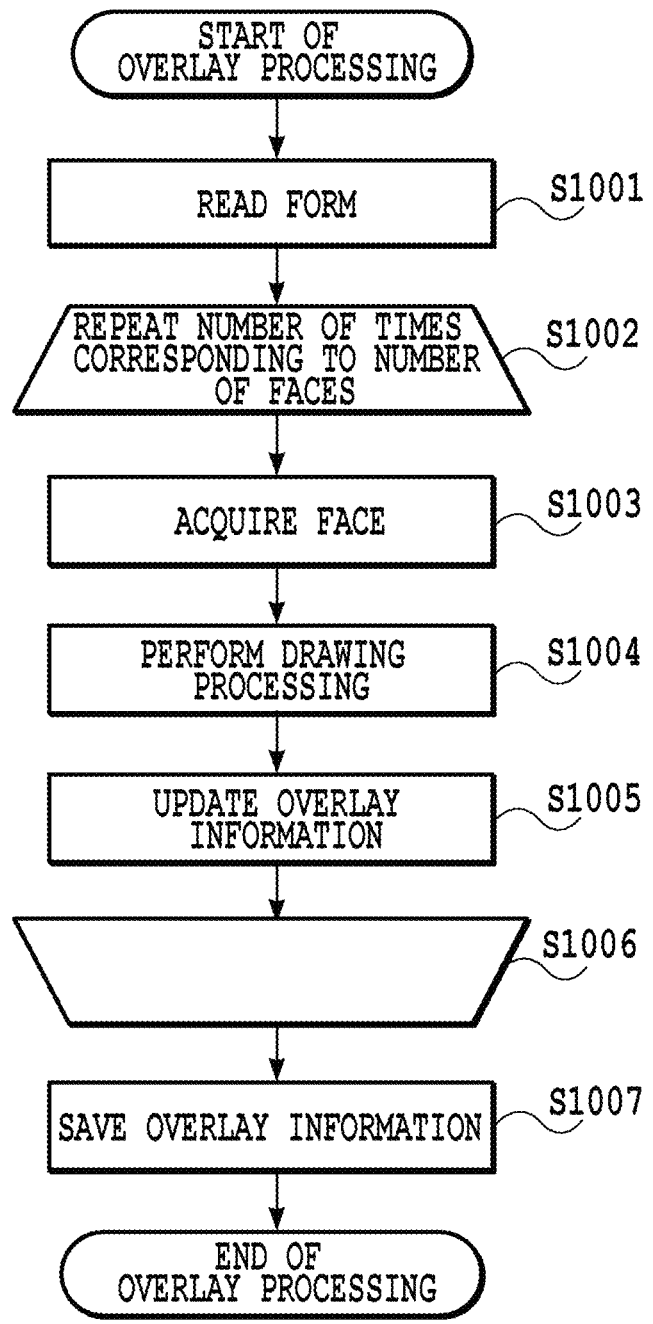
FIG. 10 is a diagram showing an overlay output processing flow for the Web form editing screen of the first embodiment.

FIG. 10 shows a flowchart representing the operation of the overlay output processing using a form in the business form generation server 101 of the present embodiment. The overlay output processing to be explained here is to generate a Web form editing screen and field data is not necessary. That is, the overlay output processing is overlay output processing to output a form graphics, such as a ruled line and a logo, defined in the form as it is. In the case of a field graphics, the character string (XXX and the like) in the output format is output as it is. Even on the Web form editing screen, it may also be possible to use a business form page, which is the results of the overlay output processing that uses common field data. In that case, after pressing down the Web form editing button 907, a user specifies field data by a field data specification dialog, not shown schematically. The business form generation server 101 overlays the specified field data and the form and generates a Web form editing screen by using a business form page, which is the results thereof.

In the following, the operation of the overlay output processing using only a form is explained.

At step S1001, the business form generation unit 304 reads the form acquired at step S708. At step S1002 to step S1006, the business form generation unit 304 repeats the processing at step S1003 to step S1005 the number of times corresponding to the faces defined in the form acquired at step S1001. In the case where the form is a composite form, a plurality of faces is defined as in Composite form 501, and therefore, the processing is repeated the number of times corresponding to the plurality of faces. In the case where the form is a common form (that is, a single form), the processing is performed by assuming that there is one virtual face.

At step S1003, the business form generation unit 304 acquires a face (or virtual face) that is the current target from a composite form (or from a common form). Information on the face is saved in the RAM 203 of the business form generation server 101.

At step S1004, the business form generation unit 304 performs drawing processing of the acquired face. The overlay to pour field data is not performed and a form graphics is drawn as it is. Further, as to a field graphics, the output format information (XXX and the like) on the field graphics is acquired and the character string thereof is drawn with the attribute (character color, font size, and so on) specified to the field graphics. The business form generation unit 304 notifies the PDF generation module in the printer driver format of the drawing information via the virtual printer and generates a business form page in the PDF format.

At step S1005, the business form generation unit 304 updates the overlay information.

Figure 11:
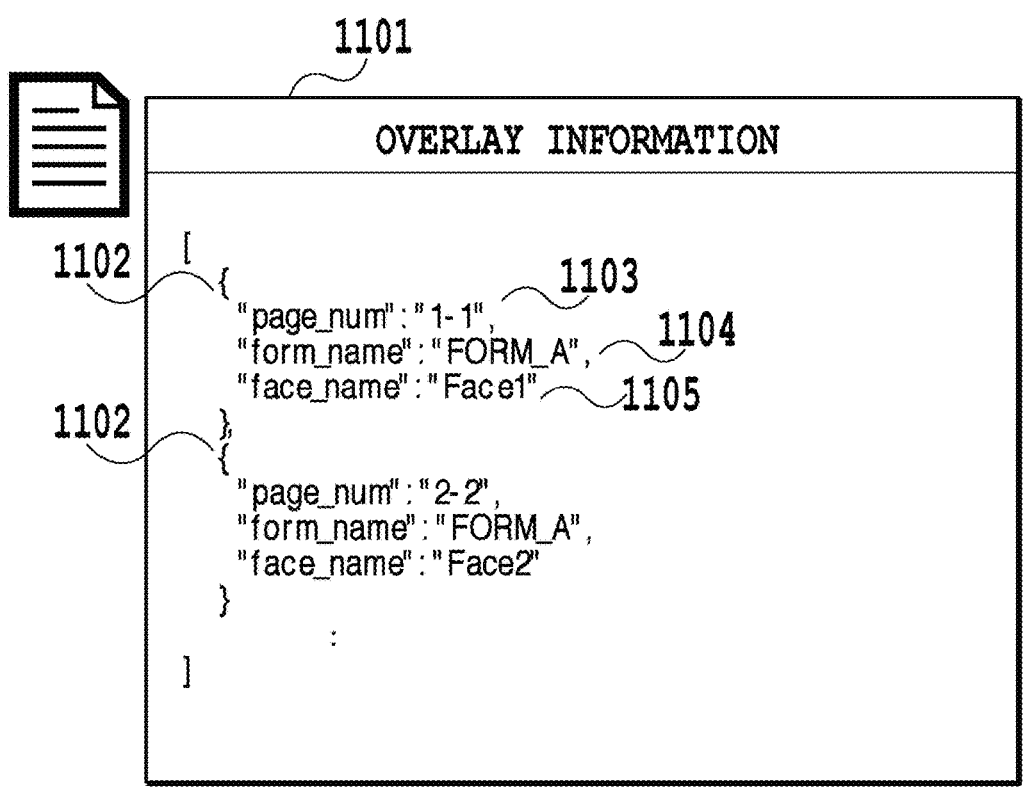
FIG. 11 is a diagram showing an example of overlay information for the Web form editing screen of the first embodiment.

FIG. 11 is an example of overlay information that is generated by the flow in FIG. 10. Overlay information 1101 is information that is utilized at the time of constructing a Web form editing screen and the like. The overlay information 1101 includes information that can be acquired only at the time of overlay. In the present embodiment, it is assumed that the overlay information 1101 is made up in the file format (JSON format), but the format is not limited.

The overlay information 1101 includes a plurality of page blocks 1102. The page block 1102 is a block that puts together information on business form pages in a specific range. For example, the first page block 1102 of the overlay information 1101 includes a page range 1103, a utilized form name 1104, and a utilized face name 1105. The page range 1103 indicates a range of business form pages that are a target of information indicated by this page block. Here, "1-1" indicates "<start page>-<end page>" and in this case, one page is the target range. The utilized form name 1104 is the name of the form utilized in the business form page range. The utilized face name 1105 is the name of the face that is utilized in the business form page range thereof. Referring to the overlay information 1101, it is known that the face "Face1" of the form "FORM_A" is utilized on the first page of the business form and that the face "Face2" of the form "FORM_A" is utilized on the second page.

Returning to FIG. 10, at step S1005, the business form generation unit 304 adds information on a page block to the overlay information based on the names of the form and the face currently being processed and the current number of business form pages (the same as the number of faces). In the case where overlay information does not exist, overlay information is generated newly. The information on a page block is added in the number corresponding to the number of faces. Further, the current number of business form pages is stored in the RAM 203 and managed by the business form generation unit 304.

At step S1007, the business form generation unit 304 stores the overlay information generated via the data access unit 303 in the overlay information database 309. Then, information that can specify the generated overlay information is added to the record in the database 305 of the business form-related data.

Returning to the explanation in FIG. 7, at step S710, the business form generation unit 304 converts the business form page in the PDF format, which is generated by the drawing processing at step S1004, into a business form page in the SVG (Scalable Vector Graphics) format. Because the business form page in the PDF format cannot be edited directly on the Web browser, it is changed into the format that can be edited (in the case of the present embodiment, the SVG format). Following the above, the business form generation unit 304 stores the generated business form page in the SVG format in the database 308 of the business form page via the data access unit 303. Then, information that can specify the generated business form page in the SVG format is added to the record in the database 305 of the business form-related data.

At step S711, the business form generation server 101 returns the URL of the Web form editing screen of the target business form of the request at step S707 to the client apparatus 102. In the URL that is returned, the information that can specify the business form page in the SVG format generated at step S710 is included. In the case of the present embodiment, in the URL that is returned, the business form name of the business form-related data in relation to the business form page is included.

At step S712, the client apparatus 102 transmits a request that is redirected to the Web form editing screen to the business form generation server 101 by using the URL returned at step S711.

At step S713, the page generation unit 302 of the business form generation server 101 generates a Web form editing screen in accordance with the contents of the redirect request at step S712. The Web form editing screen includes a business form page in the SVG format, a Javascript program to control browsing and editing operations of the business form page, and an HTML making up the screen. The page generation unit 302 acquires the business form page in relation to the request-target business form from the database 308 via the data access unit 303 by utilizing the business form name in the redirect request at step S712. In the case where there is a plurality of business form pages in relation to the target business form, the page generation unit 302 acquires a plurality of business form pages. The client apparatus 102 manages the plurality of business form pages in association with page numbers by using the Javascript program.

At step S714, the business form generation server 101 returns the Web form editing screen generated at step S713 to the client apparatus 102.

At step S715, the client apparatus 102 receives a response from the business form generation server 101 and displays the Web form editing screen on the Web browser. In the case where there is a plurality of business form pages, the client apparatus 102 displays the first page at first. Further, until business form part acquisition processing performed at step S716 that follows and the subsequent steps is completed, an icon indicating that loading is in progress is drawn in such a manner as to be overlaid on the Web form editing screen on the Web browser.

At step S716, the client apparatus 102 makes a request to acquire overlay information to the business form generation server 101. For the request, an Ajax (Asynchronous JavaScript+XML) is utilized from the Javascript program making up the screen. That is, that request is made to a REST (Representational State Transfer) interface disclosed by the business form generation server 101 by utilizing the Ajax. The client apparatus 102 makes the request to acquire overlay information to the REST interface of the business form generation server 101 by specifying the business form name.

At step S717, the business form generation server 101 acquires overlay information in relation to the request-target business form from the database 309 via the data access unit 303 based on the business form name included in the received request.

At step S718, the business form generation server 101 returns the acquired overlay information to the client apparatus 102 as a response.

At step S719, the client apparatus 102 specifies from which face the business form page currently being displayed is generated based on the overlay information. Specifically, the client apparatus 102 acquires the page number of the business form page currently being displayed. Further, the client apparatus 102 specifies the face name of the page number within the overlay information acquired by the processing at step S716 to step S718. To the first page, the first page block 1102 corresponds, and therefore, the face name is "Face1" and the face name of the second page is "Face2".

The processing at step S720 and the subsequent steps is the processing in the case where there is a business form part, and therefore, will be described later. Before the description, the Web form editing screen and business form part addition processing are explained.

Figure 12:
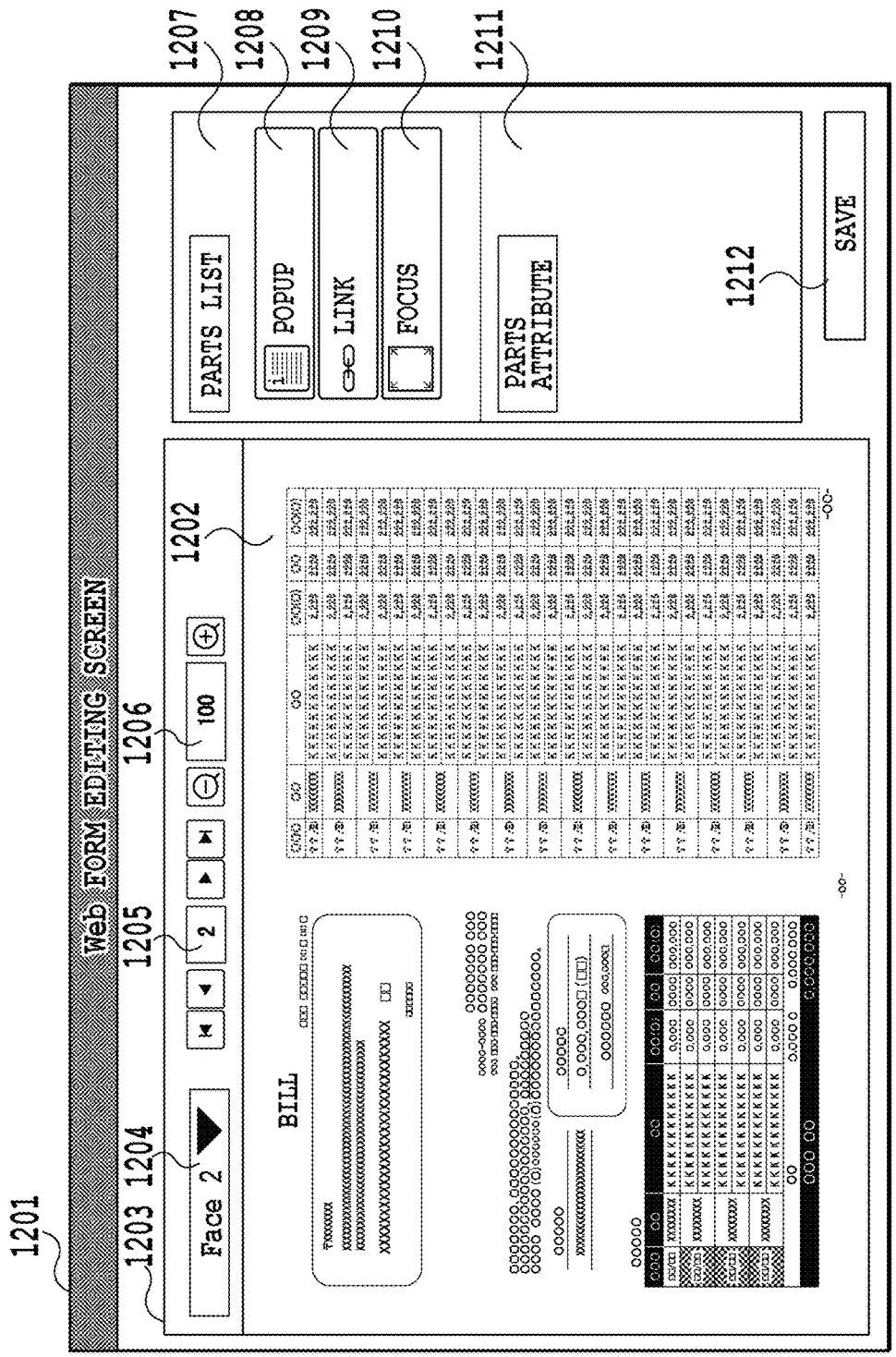
FIG. 12 is a diagram showing an example of the Web form editing screen of the first embodiment.

FIG. 12 shows an example of the Web form editing screen in the present embodiment.

A Web form editing screen 1201 is displayed on the Web browser of the client apparatus 102. In a page control area 1203, UI controls for various operations for a Web form (business form page) are arranged. An arrangement-target selection dropdown list 1204 is a control to select a target face in which parts (business form parts), to be described later, are arranged. Page transition controls 1205 are controls to switch an editing-target business form page to another. By operating each control, it is possible to move to the top page, the last page, the previous page, and the next page. A page enlargement/reduction control 1206 is a control to enlarge and reduce an editing-target business form page. It is also possible to enlarge and reduce the business form page by directly inputting a numerical value in the central area.

In a Parts list area 1207, controls (parts controls) to add parts (business form parts) that can be arranged on a business form page are arranged in order. The business form parts include a plurality of kinds and a user uses different business form parts depending on the use or the purpose. The business form parts include "popup" that displays a message in the case of being pressed down at the time of business form preview, "link" that opens a specified URL in the case of being pressed down, "focus" that defines a focus area to be explained in the present embodiment, and so on. A popup addition parts control 1208, a link addition parts control 1209, and a focus addition parts control 1210 are controls to add each business form part, respectively.

A Parts attribute area 1211 will be described later.

A Save button 1212 is a button to save information on an added business form part. In the case where the Save button 1212 is pressed down by a user after a business form part is arranged in a face, the business form part is saved.

Figure 13:
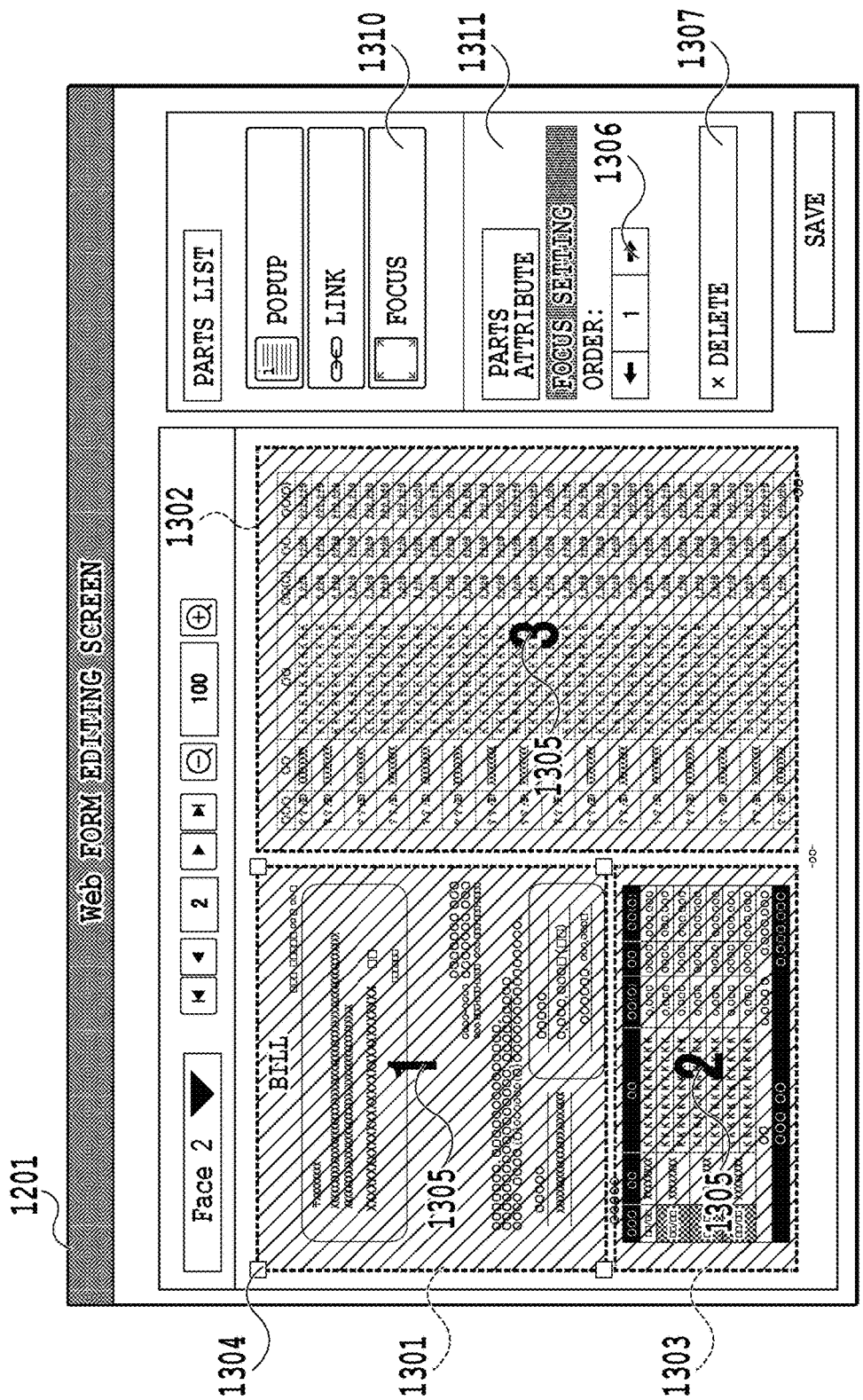
FIG. 13 is a diagram showing a state at the time of focus area setting on the Web form editing screen of the first embodiment.

FIG. 13 is an example of the Web form editing screen and for explaining arrangement of "focus", which is one of the business form parts, and an attribute setting method thereof.

Focus areas 1301, 1302, and 1303 are focus areas within the business form page, which are added to and arranged in Face2 by a user. The focus area is added by a user dragging and dropping the focus addition parts control 1210 on the business form page. The focus area is a definition of an area that is enlarged to a full-screen size at the time of displaying a Web business form browse screen, to be described later. How the definition of a focus area operates on the Web business form browse screen will be described later. A selection handle 1304 is displayed at the time of selection of a business form part. In the case where a user clicks the business form part with a mouse and the like, the selection handle 1304 is displayed in the four corners of a circumscribed rectangle of the business form part. In FIG. 13, the focus area 1301 is selected. Further, the selection handle 1304 has a function to change the size of a business form part, such as a focus area. By a user dragging any of the selection handles with a mouse and the like, it is possible to change the size of the focus area. Further, it is possible for a user to move a business form part, such as a focus area, by dragging the part itself with a mouse and the like. For example, in the focus area 1301, the inside of the part is displayed as semitransparent, and it is possible for a user to move the semitransparent portion by dragging the portion.

In a Parts attribute area 1311, controls for the attribute setting and operation relating to the business form part currently being selected are displayed in order. The controls that are displayed in the Parts attribute area change depending on the kind of business form part selected. Further, in the case where no business form part is selected, nothing is displayed in the Parts attribute area 1311. In the case where the focus area 1301 is being selected, in the Parts attribute area 1311, a focus order change control 1306 and a business form part Delete button 1307 are displayed. In the case where the business form part Delete button 1307 is pressed down, the focus area being selected is deleted. The focus order change control 1306 is a control to change the order of focus transition of each focus area. In one face (business form page), it is possible to define a plurality of focus areas. By the focus order change control 1306, in which order a plurality of focus areas is caused to make a transition is defined and set at the time of a user giving focus transition instructions, to be described later. By a user pressing down an arrow button, the transition order of the focus area being selected is changed. At this time, the transition order of focus areas not being selected, which are defined on the same face, is also changed interlockingly. The transition order of focus areas is displayed by a numerical value 1305 at the center within the focus area. In FIG. 13, the focus transition order is as follows: the focus area 1301→the focus area 1303→the focus area 1302.

Figure 14:
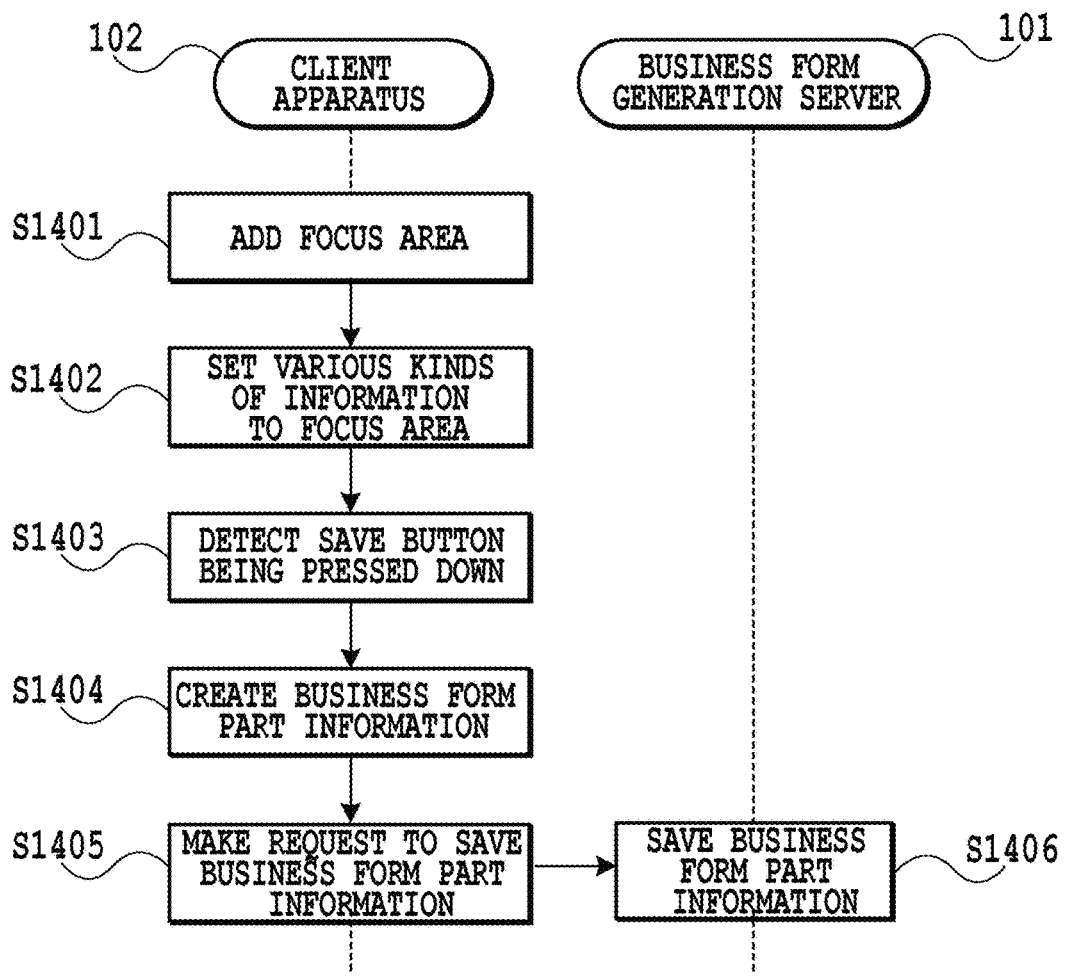
FIG. 14 is a diagram showing a saving flow of business form part information of the first embodiment.

FIG. 14 shows a flowchart of processing to add a focus area, to set an attribute, and to save a business form part explained with reference to FIG. 12 and FIG. 13.

At step S1401, the client apparatus 102 adds a focus area onto a business form page in response to the user operation to drag and drop the focus addition parts control 1210 on the business form page.

At step S1402, the client apparatus 102 sets the attributes, such as the position, the size, and the transition order, of the area to the focus area added at step S1401 in response to the user operation. The setting method of various attributes is the same as explained with reference to FIG. 13.

At step S1403, the client apparatus 102 detects the Save button 1211 being pressed down by a user. In the case where the client apparatus 102 detects the Save button 1212 being pressed down, the processing advances to step S1404.

At step S1404, the client apparatus 102 generates business form part information. The business form part information is information relating to a business form part added to the face on the Web form editing screen. The business form part information is referred to from the Web business form browse screen and the Web form editing screen at the time of displaying the business form part.

Figure 15:
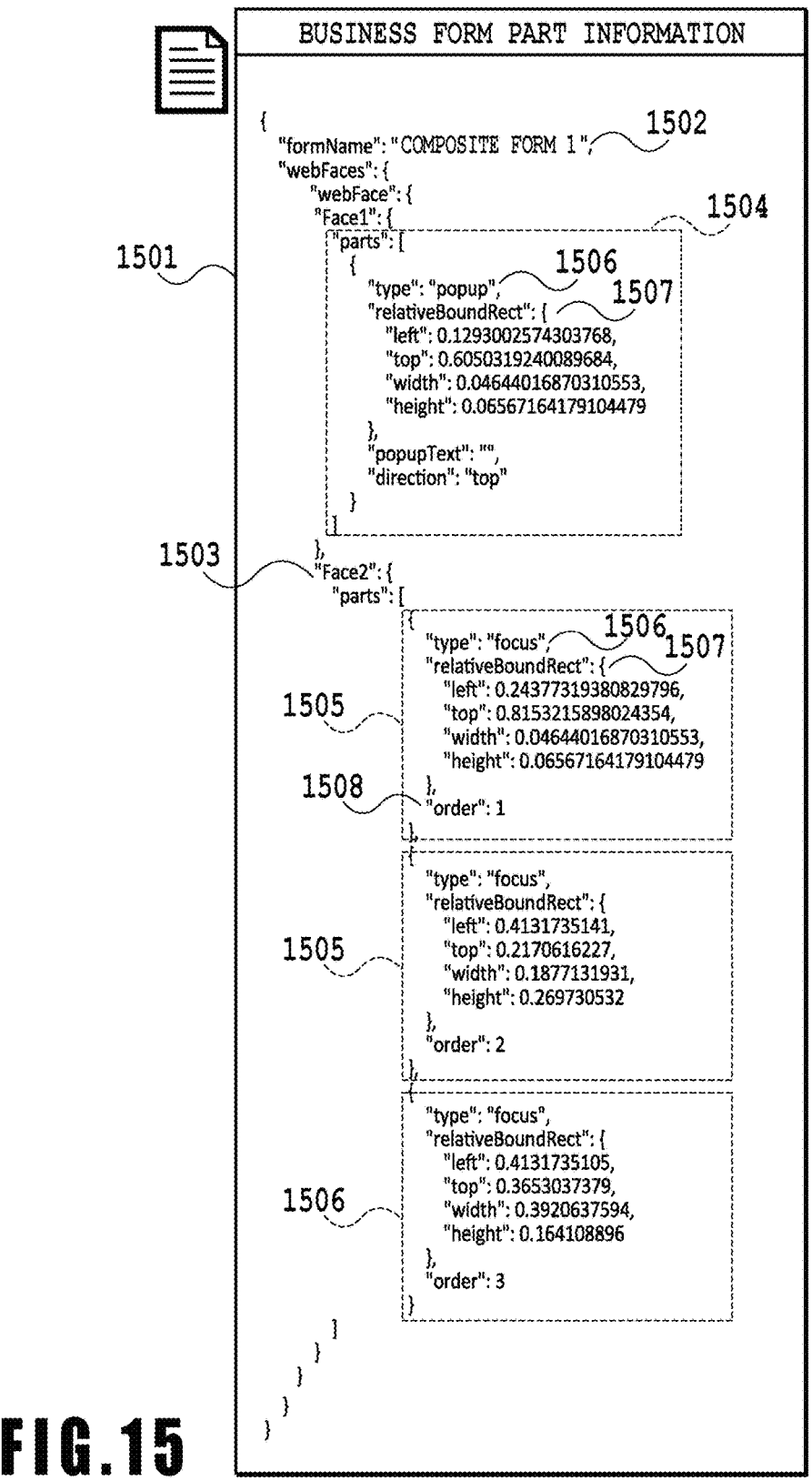
FIG. 15 is a diagram showing an example of the business form part information of the first embodiment.

FIG. 15 shows an example of business form part information in the present embodiment. In the present embodiment, business form part information 1501 is made up in the format of a JSON file.

Symbol 1502 indicates the name of a form to which the business form part information 1501 is applied. Symbol 1503 indicates a block to store the business form part for each face in the case where there is a plurality of faces. At the top of the block, the face name is described (for example, Face1, Face2, and so on). The information on these form and face is acquired from the overlay information acquired by the client apparatus 102 at step S716 to step S718. Symbol 1504 indicates an element (parts element) to store a list of a plurality of business form parts defined in the face. To Face1, only one business form part is added. Symbol 1506 indicates the type of business form part and a character string, such as popup (pop-up) and focus (focus area), is specified. Symbol 1507 indicates circumscribed rectangle information on the business form part and includes information on the origin at the top left and the width and height. To Face2, three business form parts are added and divided into each business form part block 1505. The type of business form part and the information on the circumscribed rectangle are the same as in the case of the business form part of popup. In the case of the business form part of focus area, order information 1508 indicating the focus transition order is added.

Returning to the explanation in FIG. 14, at step S1405, the client apparatus 102 transmits the request to save the business form part information generated at step S1404 to the business form generation server 101. Specifically, the client apparatus 102 sets the generated JSON file and the business form name to the request body and transmits the request body to the REST interface disclosed by the business form generation server 101.

At step S1406, the business form generation server 101 stores the business form part information in the received request in the database 310 of the business form part information via the data access unit 303. At this time, the business form generation server 101 associates the database 305 of the business form-related data and the database 310 of the business form part information with each other by using the business form name in the request body transmitted at step S1405 as a key to perform management in such a manner that the related business form part information can be searched for by a business form name.

Returning to the explanation in FIG. 7, the processing at step S720 and the subsequent steps is explained. The processing at step S720 and the subsequent steps is the processing in the case where there is a business form part. On the Web form editing screen shown in FIG. 12 and FIG. 13, a business form part, such as a focus area, is added. The added business form part is saved in the database of the business form generation server 101. Because of this, at the time of opening the Web form editing screen of the form again, it is necessary to display the already-generated business form part that is saved on the screen in advance. The processing at step S720 and the subsequent steps is necessary because of this.

At step S720, the client apparatus 102 makes a request to acquire business form part information to the business form generation server 101. The request is made to the REST interface disclosed by the business form generation server 101 by utilizing the Ajax from the Javascript program making up the screen. The client apparatus 102 makes a business form part information acquisition request to the REST interface of the business form generation server 101 by specifying a business form name.

At step S721, the business form generation server 101 acquires the business form part information in relation to the request-target business form from the database 310 via the data access unit 303 based on the business form name included in the received request.

At step S722, the business form generation server 101 returns the acquired business form part information to the client apparatus 102 as a response.

At step S723, the client apparatus 102 specifies the business form part to be displayed currently from the name of the face of the business form page currently being displayed, which is specified at step S719. Specifically, the client apparatus 102 searches the inside of the business form part information 1501 acquired at step S720 to step S722 and finds a block that coincides with the current face name. For example, in the case where the business form page generated from Face2 is displayed, the client apparatus 102 finds the block of "Face2" of the business form part information and specifies the three focus areas 1505 included therein.

At step S724, the client apparatus 102 performs processing for each business form part specified at step S723. For example, in the case of popup, it is necessary to display a popup button that can be pressed down, and therefore, the client apparatus 102 performs drawing processing of the business form part itself. In the case of focus area, the processing contents are different between the Web form editing screen and the Web business form browse screen, to be described later. In the case of the Web form editing screen, the drawing processing of a dot-line frame of an area, a numerical value indicating the focus transition order, and so on as shown in FIG. 13 is performed.

On completion of the processing for all the business form parts, the client apparatus 102 deletes the icon indicating that loading is in progress, which is drawn so as to be overlaid on the Web form editing screen at step S715.

Figure 16:
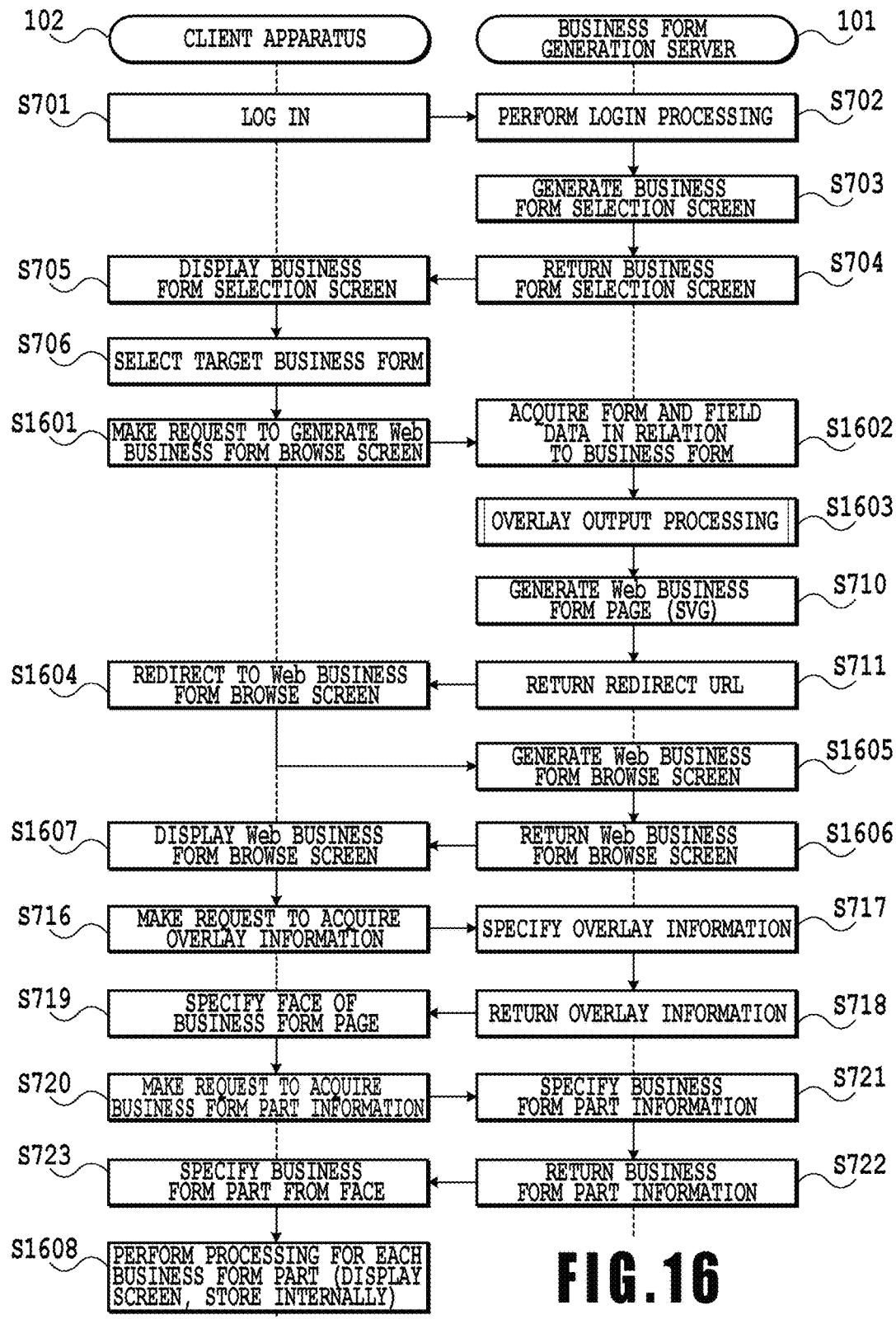
FIG. 16 is a diagram showing a sequence of processing to generate a Web business form browse screen of the first embodiment.

FIG. 16 shows a sequence of Web business form browse screen generation processing in the present embodiment. The Web business form browse screen is a screen on which to browse a business form page (SVG) of the present embodiment, and is displayed by the OS and the Web browser that run on a tablet device, such as iPad, and operated.

The flow of the Web business form browse screen generation processing is basically the same as the flow of the Web form editing screen generation processing described above with reference to FIG. 7. Because of this, in the following, only portions different from those of the flow of the sequence shown in FIG. 7 are explained.

At step S1601, the client apparatus 102 transmits a request to generate a Web business form browse screen to the business form generation server 101 by a user pressing down the Web business form preview button 908 within Business form selection screen 901. In the request to generate a Web business form browse screen, information that can specify the browse-target business form is included.

At step S1602, the business form generation unit 304 of the business form generation server 101 acquires the form and field data in relation to the browse-target business form via the data access unit 303.

At step S1603, the business form generation unit 304 of the business form generation server 101 performs the overlay output processing by using the form and field data acquired at step S1602.

In the following, the operation of the overlay output processing in the Web business form browse screen generation processing is explained in detail.

Figure 17:
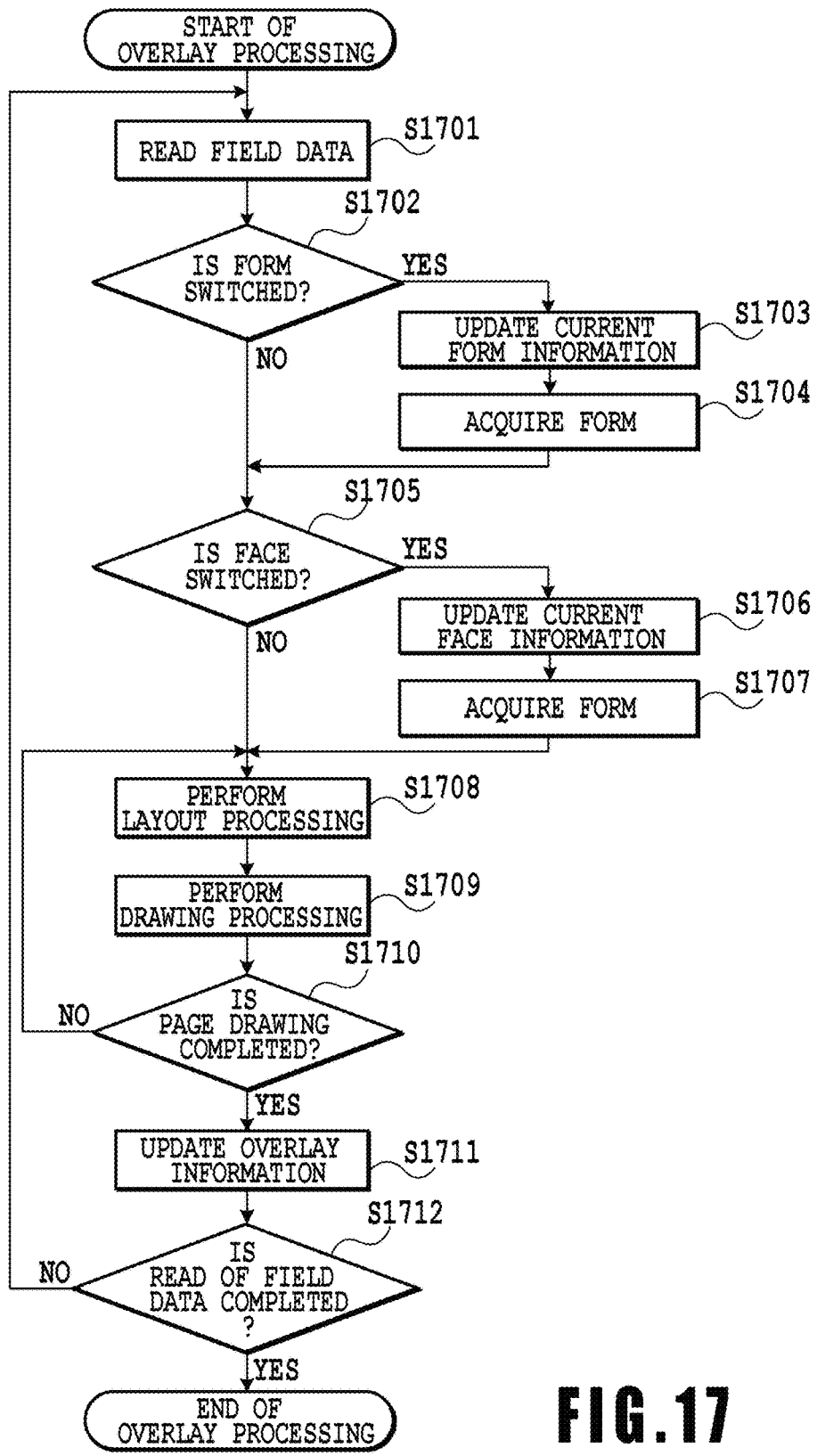
FIG. 17 is a diagram showing an overlay output processing flow for the Web business form browse screen of the first embodiment.

FIG. 17 shows a flowchart representing the operation of the overlay output processing using the form and field data in the business form generation server 101 of the present embodiment. The overlay output processing that is explained here is for generating a Web business form browse screen and the field data is poured into the form and the overlay output processing is performed actually.

At step S1701, the business form generation server 101 reads the contents of the processing-target field data.

At step S1702, the business form generation server 101 determines whether the form switch command 602 is included within the read field data. In the case where the form switch command 602 is not included, the processing advances to step S1705. On the other hand, in the case where the form switch command 602 is included, the processing advances to step S1703.

At step S1703, the business form generation server 101 updates current form information. The current form information is buffer information for storing the current processing-target form and is managed by the business form generation server 101 on the RAM 203. The business form generation server 101 updates the current form information so that the switch destination form specified by the form switch command 602 becomes the current form.

At step S1704, the business form generation server 101 reads the contents of the switch destination form that has become the current form at step S1703 onto the RAM 203.

At step S1705, the business form generation server 101 determines whether the face switch command 603 is included within the field data read at step S1701. In the case where the face switch command 603 is not included, the processing advances to step S1708. On the other hand, in the case where the face switch command 603 is included, the processing advances to step S1706.

At step S1706, the business form generation server 101 updates current face information. The current face information is buffer information for storing the current processing-target face and is managed by the business form generation server 101 on the RAM 203. The business form generation server 101 updates the current face information so that the switch destination face specified by the face switch command 603 becomes the current face. In the case where the current form is not a composite form but a normal form, the current form is always a "virtual face".

At step S1707, the business form generation server 101 reads the contents of the form, which is the entity of the switch destination face that has become the current face at step S1706, onto the RAM 203.

At step S1708, the business form generation server 101 performs layout processing. The layout processing is processing to pour the read field data into a filed graphics defined in the form and to determine the arrangement of characters and various objects after reflecting the various attributes, such as the character size set to the field graphics.

At step S1709, the business form generation server 101 performs the drawing processing for each page. The business form generation server 101 actually draws the various objects, such as the character string, in accordance with the arrangement determined at step S1708. Specifically, the business form generation server 101 draws each object by using the function, such as TextOut provided by GDI (Graphics Device Interface) of Windows (registered trademark).

At step S1710, the business form generation server 101 determines whether drawing of one page is completed. The business form generation server 101 reads the field data at step S1708 and step S1709 described above and performs the layout processing and the drawing processing while pouring the field data into the field graphics, but does not perform processing that takes into consideration the end of one page at each step. Because of this, at this step, the business form generation server 101 checks whether drawing of one page is completed. In the case where drawing of one page is not completed, the processing returns to step S1708 and the layout processing and the drawing processing are continued. In the case where it is determined that drawing of one page is completed, the processing advances to step S1711. The determination of whether drawing of one page is completed is performed by overflow detection of the field data. For example, the business form generation server 101 determines that drawing of one page is completed in the case where read of the field data exceeding the maximum number of lines of the table defined in the face is detected at the time of repeating the layout processing and the drawing processing.

At step S1711, the business form generation server 101 updates the overlay information.

Here, before explaining updating processing of the overlay information, the overlay information in the Web business form browse screen generation processing is explained in detail.

Figure 18A:
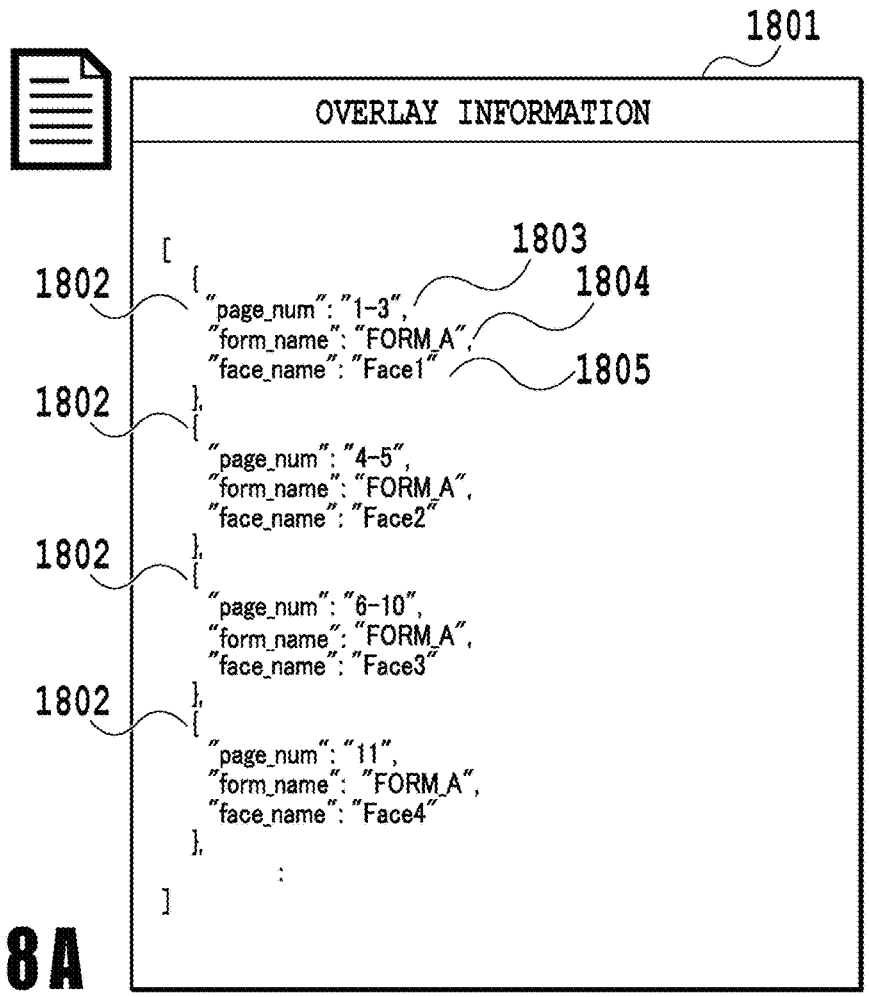
FIG. 18A and FIG. 18B are each a diagram showing an example of overlay information for the Web business form browse screen of the first embodiment.
Figure 18B:
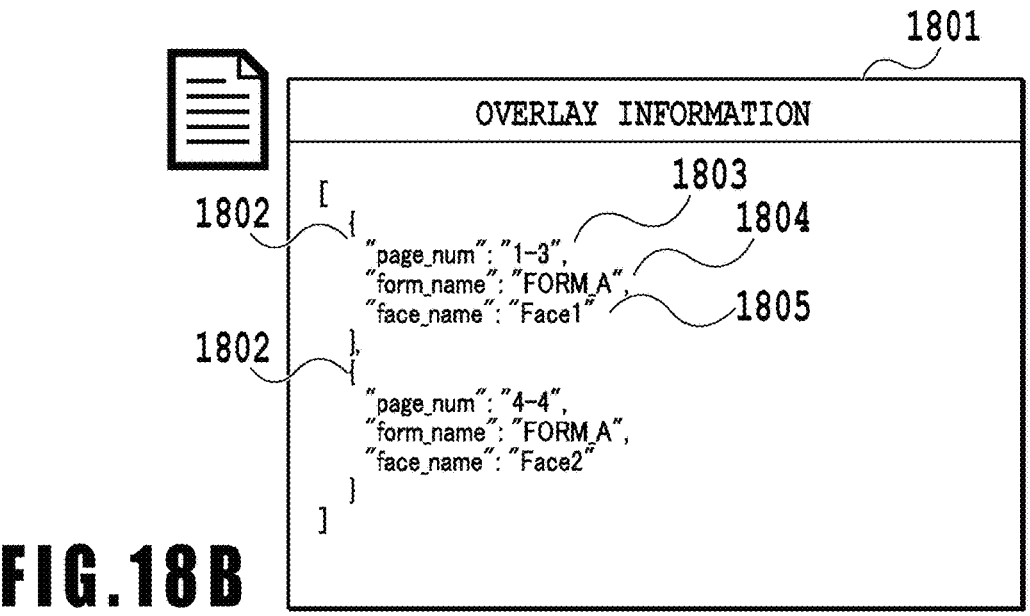

FIG. 18A and FIG. 18B show each an example of the overlay information that is generated by the overlay output processing in the Web business form browse screen generation processing. The basic items are the same as those in the example shown in FIG. 11.

FIG. 18A shows the finished overlay information after the overlay output processing of all the pages is completed. Referring to overlay information 1801, it is known that on the first to third pages, the face "Face1" of the form "FORM_A" is utilized, on the fourth and fifth pages, the face "Face2" of the form "FORM_A" is utilized, and so on.

FIG. 18B is the overlay information on the way of generation in the case where the overlay processing of all the pages is not completed yet. One page on which the face "Face2" of the form "FORM_A" is utilized is generated, but the second page (fifth page of all the pages) and subsequent pages are not generated yet.

Returning to FIG. 17, with reference to FIG. 18A and FIG. 18B, the overlay information updating processing at step S1711 is explained.

At step S1711, the business form generation server 101 updates a page range 1803, a utilized form name 1804, and a utilized face name 1805 of a page block 1802 of the page as in FIG. 18B. The page range 1803 is updated by using the number of the business form page currently being processed, which is stored in the RAM 203. For example, the business form generation server 101 updates the value of the page range 1803 from "4-4" to "4-5" in the case of the timing at which drawing of the fifth page is completed in the processing of the face "Face2" of the form "FORM_A". The utilized form name 1804 is rewritten to the current form information updated at step S1703. The utilized face name 1805 is rewritten to the current face information updated at step S1706. In the case where the utilized form name 1804 and the utilized face name 1805 are already the current form and the current face, rewriting is not performed.

At step S1712, the business form generation server 101 determines whether the read of the field data is completed. In the case where the read is completed, the overlay output processing is terminated. In the case where the read is not completed, the processing returns to step S1701 and the read of the field data is continued.

Returning to the explanation in FIG. 16, at step S1604 to step S1607, basically the same processing at the corresponding steps shown in FIG. 7 is performed. A difference from FIG. 7 lies only in that the target screen is not the Web form editing screen but the Web business form browse screen, and therefore, explanation thereof is omitted.

At step S1608, the client apparatus 102 performs processing for each business form part specified at step S723. As to the focus area, different from the Web form editing screen shown in FIG. 13, on the Web business form browse screen, the drawing processing of the dot-line frame of the area and the numerical value and the like indicating the focus transition order is not necessary, and therefore, the drawing processing is not performed. However, in order to perform focus processing, to be described later, information on the size and the transition order themselves of the focus area is necessary, and therefore, the client apparatus 102 reads the information onto the RAM 203.

FIG. 19 shows an example of the Web business form browse screen generated in accordance with the flow of the sequent explained with reference to FIG. 16. As a matter of convenience, on Web business form browse screen 1901, each area of focus areas 1902, 1903, and 1904 is indicated by the dot-line frame, but on the actual screen, the dot line is not displayed. The size and the transition order of the focus area are stored in the RAM 203.

Figure 20:
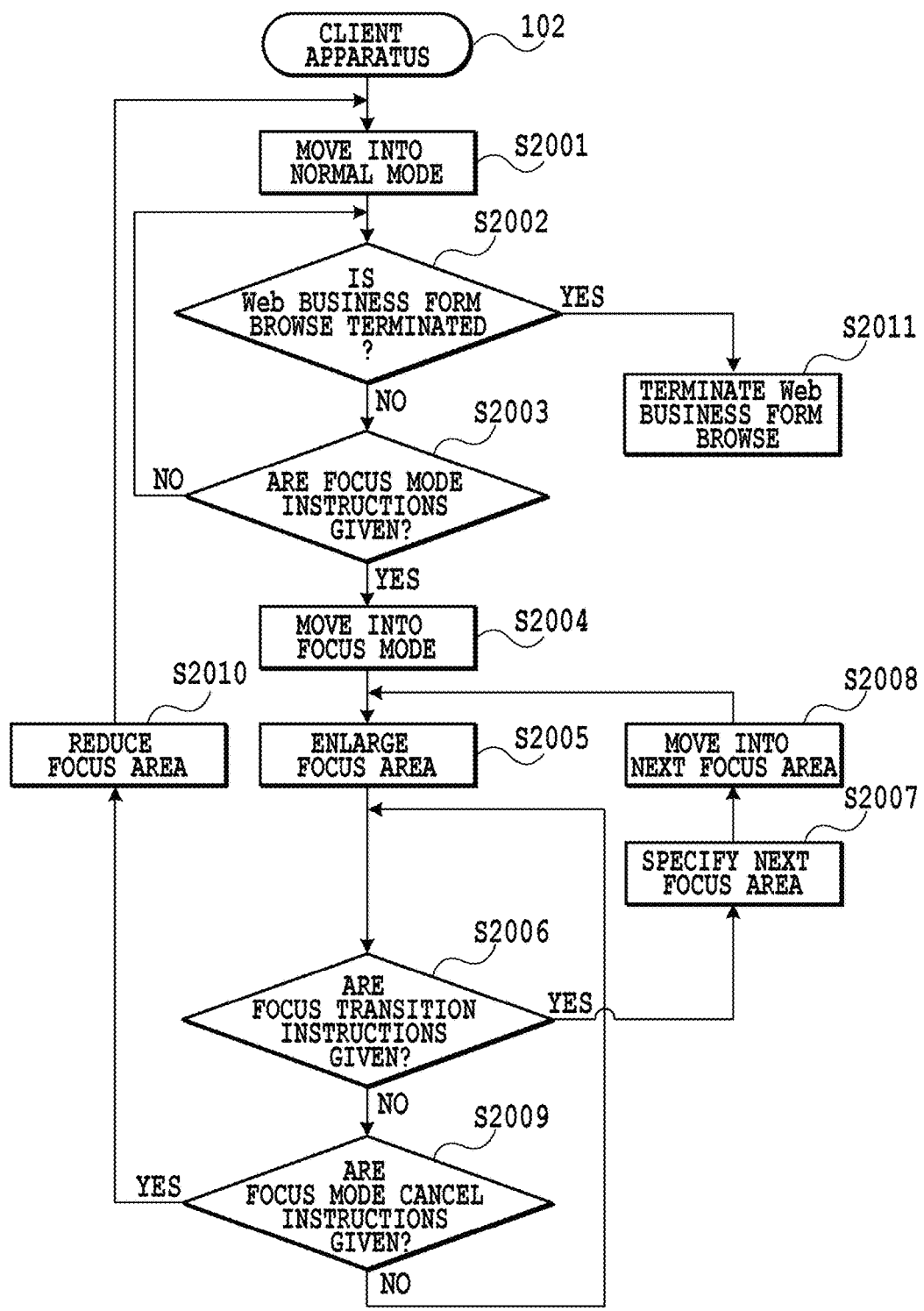
FIG. 20 is a diagram showing a processing flow at the time of browsing the Web business form browse screen of the first embodiment.

FIG. 20 shows a flowchart showing a flow at the time of browsing a Web business form and performing processing to enlarge a focus area on the Web business form browse screen.

At step S2001, the client apparatus 102 moves the mode into the normal mode. The client apparatus 102 controls two display modes, that is, the normal mode and the focus mode, by the Javascript program making up the Web business form browse screen, which runs on the Web browser. The normal mode is a mode in which a focus area is not enlarged and the focus mode is a mode in which a focus area is enlarged in accordance with a user operation. Which mode is set currently is stored in the RAM 203 by the Javascript program. At step S2001, the client apparatus 102 moves the display mode into the normal mode through the Javascript program.

At step S2002, the client apparatus 102 determines whether instructions to terminate browse of the Web business form are given by a user. In the case where the Web business form browse screen is closed by the mouse operation of a user and the like, it is determined that instructions to terminate browse are given and the processing advances to step S2011. On the other hand, in the case where instructions to terminate browse are not given, the processing advances to step S2003.

At step S2003, the client apparatus 102 determines whether instructions to move into the focus mode are given. In the case where instructions to move into the focus mode are not given, the processing returns to step S2002. On the other hand, in the case where instructions to move into the focus mode are given, the processing advances to step S2004. The instructions to move into the focus mode are given by a gesture input of a user to a tablet device. For example, the client apparatus 102 regards detection of a double tap gesture within a focus area as the instructions to move into the focus mode. It may also be possible to perform settings so that any gesture is regarded as the instructions to move into the focus mode or to use a method of giving instructions by something other than a gesture. The client apparatus 102 utilizes the information stored in the RAM 203 at step S1608 in FIG. 16 at the time of specifying the position and size of a focus area.

At step S2004, the client apparatus 102 moves the display mode into the focus mode through the Javascript program.

At step S2005, the client apparatus 102 enlarges the portion of the focus area whose transition order is the first so that the focus area becomes the largest of the business form page areas within the Web business form browse screen. The client apparatus 102 performs enlargement processing based on the size and the transition order of the focus area, which are read onto the RAM 203 at step S1608.

FIG. 21 shows an example of the Web business form browse screen in the state where the portion of a focus area is enlarged by the Javascript program of the client apparatus 102. On Web business form browse screen 2101 in FIG. 21, as a matter of convenience, the focus area is indicated by a dot line, but on the actual Web business form browse screen, the dot-line frame is not displayed. The client apparatus 102 enlarges the focus area so that both the vertical side and the horizontal side become the maximum length while preventing those from exceeding both the vertical side and the horizontal side corresponding thereto of Web business form browse screen 2101.

Returning to FIG. 20, at step S2006, the client apparatus 102 determines whether focus transition instructions are given. In the case where focus transition instructions are not given, the processing advances to step S2009. On the other hand, in the case where focus transition instructions are given, the processing advances to step S2007. The focus transition instructions are given by a gesture input of a user to a touch device. For example, the client apparatus 102 regards detection of a flick gesture within a focus area as the focus transition instructions. It may also be possible to perform settings so that any gesture is regarded as the focus transition instructions or to use a method of giving instructions by something other than a gesture.

At step S2007, the client apparatus 102 specifies the next focus area. The client apparatus 102 utilizes the information stored in the RAM 203 at step S1608 at the time of specifying the next focus area and further specifying the position and size thereof.

At step S2008, the client apparatus 102 moves the focus area to the focus area specified at step S2007. It may also be possible for the client apparatus 102 to produce an animation display at the time of transition between focus areas and to show the way of transition to a user. After the movement at step S2008, the processing returns to step S2005 and the client apparatus 102 enlarges the movement destination area.

FIG. 22 shows an example of the Web business form browse screen in the state where the second focus area is enlarged as the results at step S2008 and step S2005. On Web business form browse screen 2201 in FIG. 22 also, as in FIG. 21, as a matter of convenience, the focus area is indicated by a dot line. The client apparatus 102 enlarges the focus area so that both the vertical side and the horizontal side of the focus area become the maximum length while preventing those from exceeding both the vertical side and the horizontal side corresponding thereto of Web business form browse screen 2201.

Returning to FIG. 20, at step S2009, the client apparatus 102 determines whether instructions to cancel the focus mode are given. In the case where instructions to cancel the focus mode are not given, the processing returns to step S2006 and the client apparatus 102 waits for focus transition instructions. On the other hand, in the case where instructions to cancel the focus mode are given, the processing advances to step S2010. The instructions to cancel the focus mode are also given by a gesture input of a user to a tablet device. For example, it is possible for the client apparatus 102 to regard a double tap gesture within the focus area as the instructions to cancel the focus mode.

At step S2010, the client apparatus 102 reduces the focus area and returns the Web business form browse screen to the enlargement ratio of the full screen. After this, the processing returns to step S2001 and the client apparatus 102 continues the processing in the normal mode.

As explained above, according to the present embodiment, it is possible to generate and store the business form parts to enlarge a specific area within a business form page on the client apparatus, which is set as a focus area in relation to the form that is the protocol of the business form. Then, it is possible to enlarge the specific area within the display screen of a device based on the information on the focus area at the time of browsing the business form. Due to this, for example, even in the case of a business form resource whose sheet size is large, such as A3 and A4, which is designed for the already-existing printing purpose, it is possible to improve recognizability at the time of browse on a Web page. Further, at the time of movement of a specific area to be enlarged on the client apparatus, it is possible to improve operability by simplifying the operation by a user. Furthermore, it is made possible to browse a business form without loosing the entire view of the business form.

(Second Embodiment)

In the present embodiment, it is made possible to arrange the same focus area (business form part) at the common portion of all the different faces. By doing so, compared to the case where the same focus area is arranged in the individual face, it is possible to reduce time and effort of a user. The basic processing is the same as that of the first embodiment, and therefore, only different portions are explained.

Figure 23:
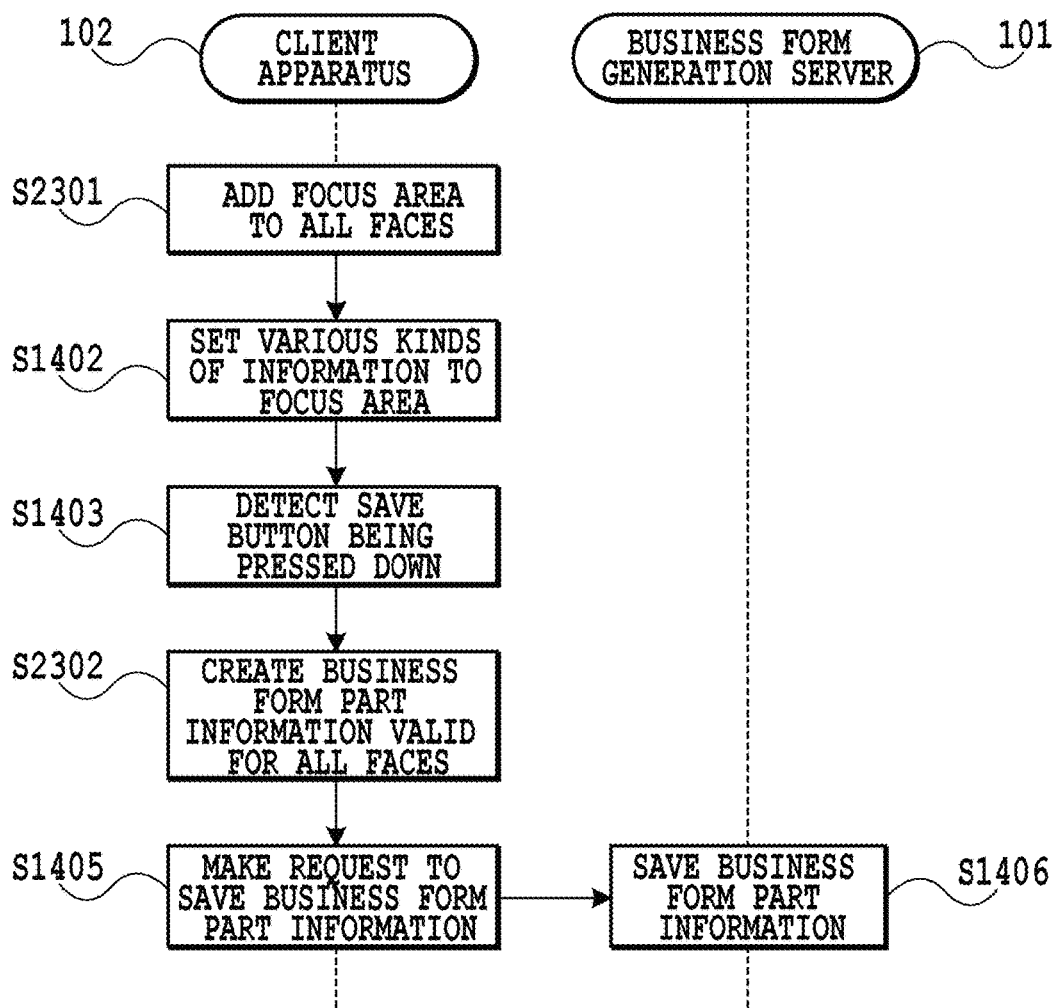
FIG. 23 is a diagram showing a saving flow of business form part information of a second embodiment.

FIG. 23 shows a flowchart of processing at the time of business form part saving on the Web form editing screen in the present embodiment. Basically, the flow is the same as the flow explained with reference to FIG. 14 in the first embodiment. Consequently, in the following, a comparison with the first embodiment is made and only different portions are explained.

At step S2301, the client apparatus 102 adds a focus area as a business form part that is arranged for all the faces in accordance with instructions of a user. Specific contents are explained with reference to FIG. 24, to be shown later.

Figure 24:
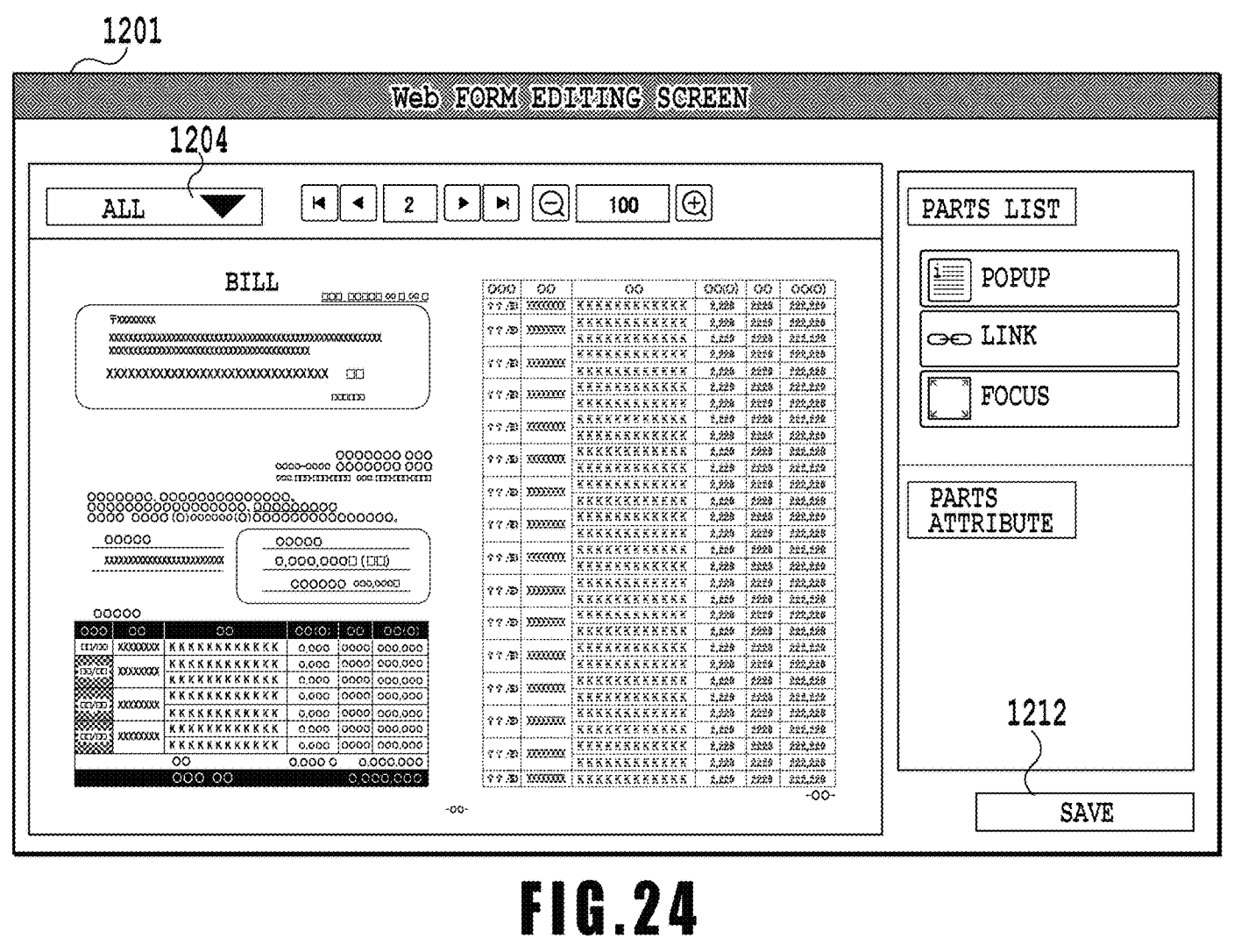

FIG. 24 shows an example of the Web form editing screen in the present embodiment. The Web form editing screen shown in FIG. 24 is a screen similar to Web form editing screen 1201 shown in FIG. 12, but the configuration differs in that "ALL" can be selected by operating the arrangement-target selection dropdown list 1204. "ALL" means that the target in which a focus area is arranged is all the faces. In the present embodiment, a user selects "ALL" by operating the arrangement-target selection dropdown list 1204 and changes the target of arrangement to all the faces. After this, a user gives instructions to save a focus area by adding a focus area and pressing down the Save button 1212.

Returning to FIG. 23, at step S2302, the client apparatus 102 generates business form part information valid for all the faces. Specific contents are explained with reference to FIG. 25, to be shown later.

Figure 25:
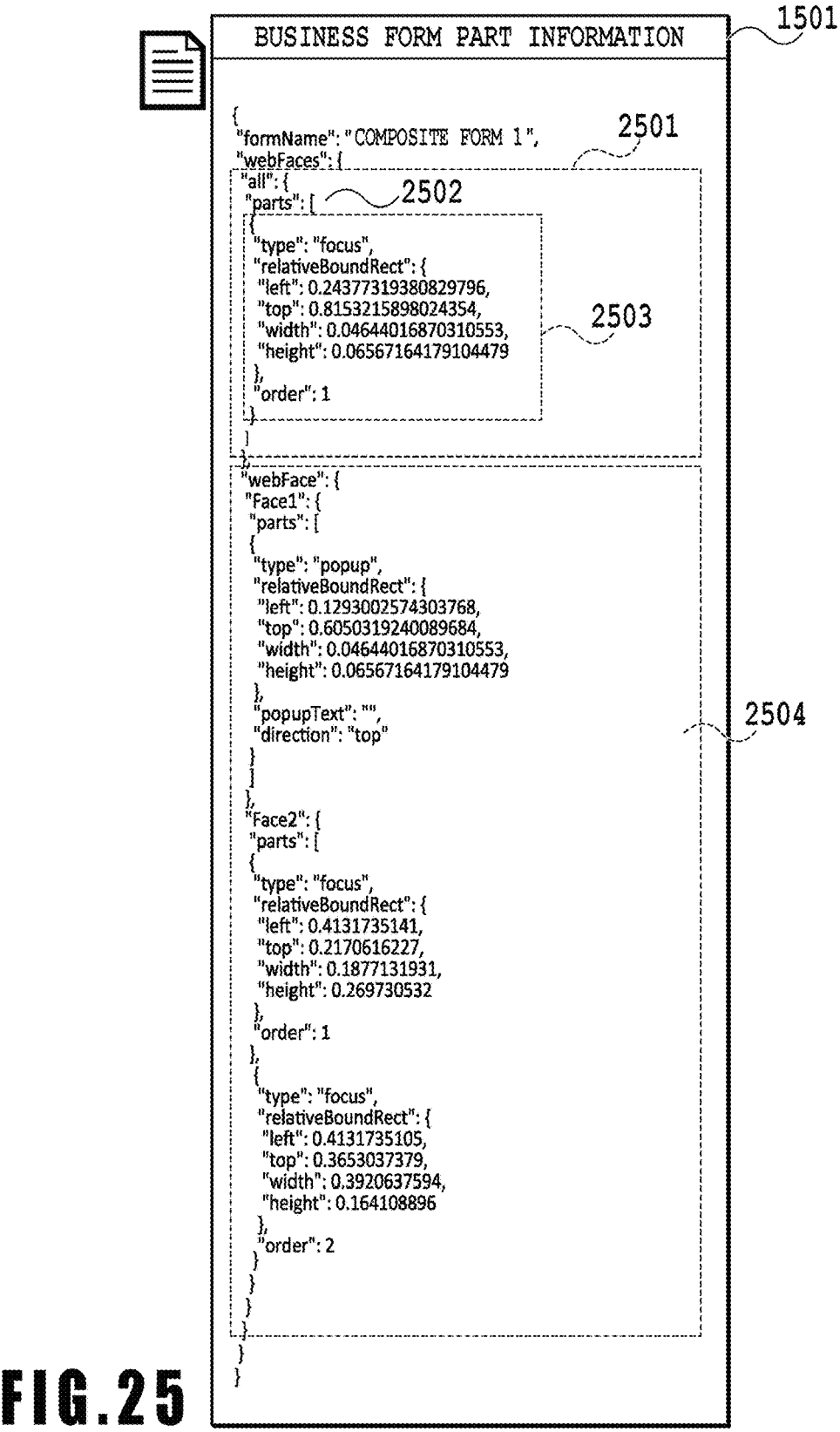
FIG. 25 is a diagram showing an example of the business form part information of the second embodiment.

FIG. 25 shows an example of the business form part information including a business form part valid for all the faces. The business form part information shown in FIG. 25 has a configuration similar to that of the business form part information 1501 shown in FIG. 15, and here, different portion are explained.

The business form part information 1501 in the present embodiment includes a block 2501 labeled as "all". The block 2501 labeled as "all" is the portion storing information on a business fame part valid for all the faces. After a "parts" block 2502, a list of business form parts valid for all the faces is shown. In this example, only one part is shown, but it is possible for the "parts" block 2502 to store a plurality of parts. Each part is represented by a block 2503. In the example, one focus area is stored. In this example, not only the "all" block 2501 but also a portion 2504 storing the business form part for each face is stored in the same file. That is, it is possible to similarly set the business form part valid for all the faces in the face in which the business form part is set individually and in the other faces in which no business form part is set.

The transition order (order information) of one or more business form parts valid for all the faces and the transition order (order information) of one or more business form parts set in the individual face are controlled independently of each other. For example, control is performed so that one or more business form parts within the block 2501 labeled as "all" are displayed at first and next, one or more business form parts within the portion 2504 storing the business form part for each face are displayed. On the contrary, it may also be possible to perform settings and control so that one or more business form parts within the portion 2504 storing the business form part for each face are displayed at first.

Figure 26:
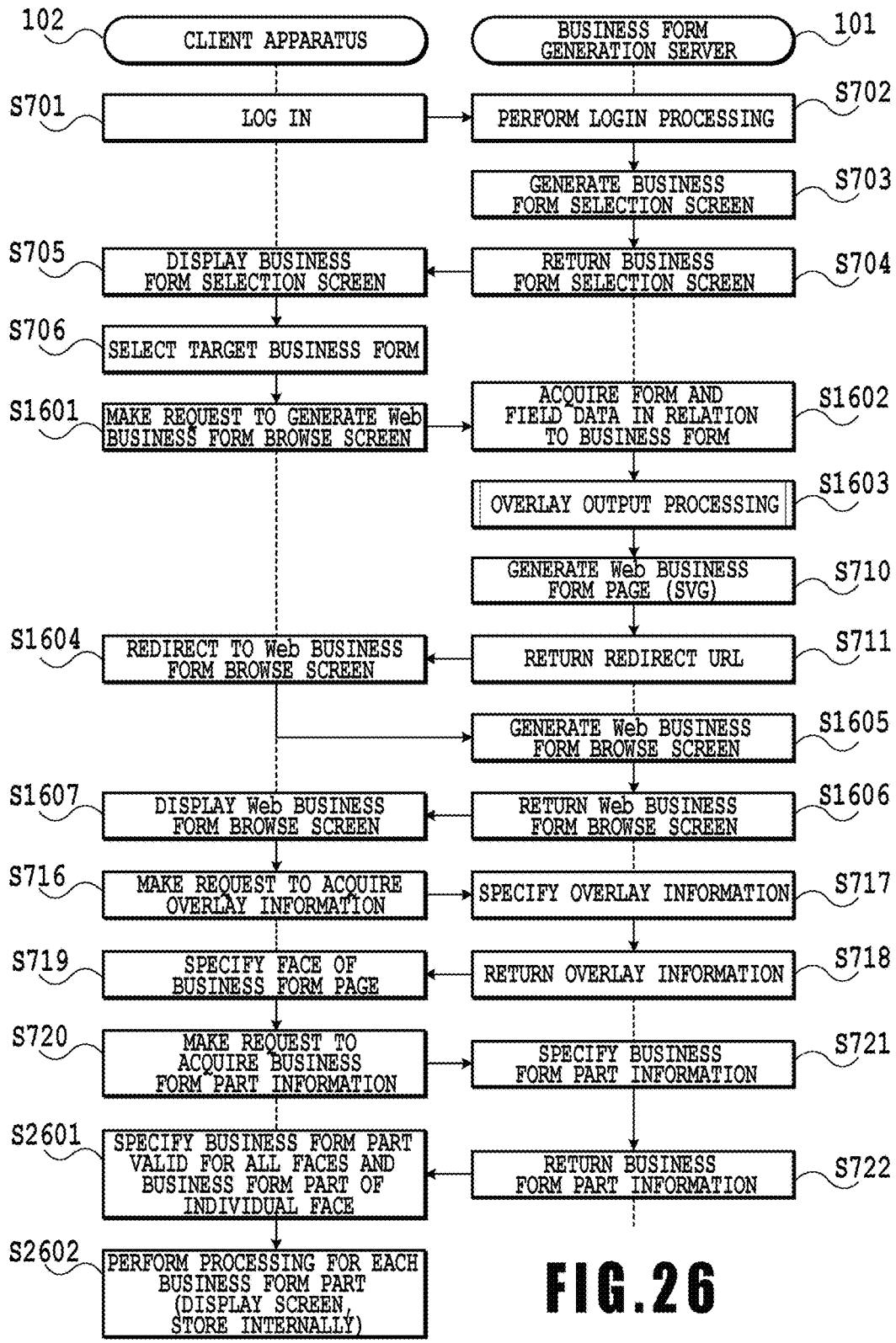
FIG. 26 is a diagram showing a sequence of processing to generate a Web business form browse screen of the second embodiment.

FIG. 26 shows a sequence of the Web business form browse screen generation processing in the present embodiment. Basically, the flow is the same as the flow of the Web business form browse screen generation processing described above with reference to FIG. 16. Consequently, in the following, only portions different from the sequence shown in FIG. 16 are explained.

At step S2601, the client apparatus 102 specifies the business form part valid for all the faces and the business form part of the individual face based on the business form part information received from the business form generation server 101. Specifically, the client apparatus 102 specifies the business form part valid for all the faces by making a search to check whether the block 2501 labeled as "all" exists in the business form part information acquired at the previous step. Further, the client apparatus 102 specifies the business form part of the individual face by making a search to check whether the portion 2504 storing the business form part corresponding to each face exists.

At step S2602, the client apparatus 102 performs processing of each business form part specified at step S2601. The contents thereof are the same as those explained at step S1608.

As above, in the case where the business form part valid for all the faces and the business form part unique to each face exist, both the business form parts are processed and exist mixedly.

In such a case where a composite form is utilized, on many occasions, a business form part is set to the common portion even though the faces are different. For example, there is a case where the header portion is common even though the format of the detailed portion of each bill is different. In such a case, on a condition that it is desired to set a focus area to the head portion, in the first embodiment, it is necessary to add the focus area to the header individually for each face. On the other hand, in the present embodiment, by making it possible to select "ALL" in the arrangement-target selection dropdown list 1204 of Web form editing screen 1201 and to arrange the focus area to the common portion of different faces, it is possible to reduce time and effort of a user.

(Third Embodiment)

In the present embodiment, in a composite form, it is made possible to arrange a business form part (hereinafter, called a default business form part) that is valid for a face in which no business form part is arranged. The face in which no business form part is arranged means a face that does not include any business form part, such as "popup" and "link", other than "focus". According to the default business form part of the present embodiment, for example, by using both the default business form part and the business form part that is arranged in the individual face, it is possible to reduce time and effort of a user at the time of business form part setting. The basic processing is the same as that of the first embodiment, and therefore, only different portions are explained.

Figure 27:
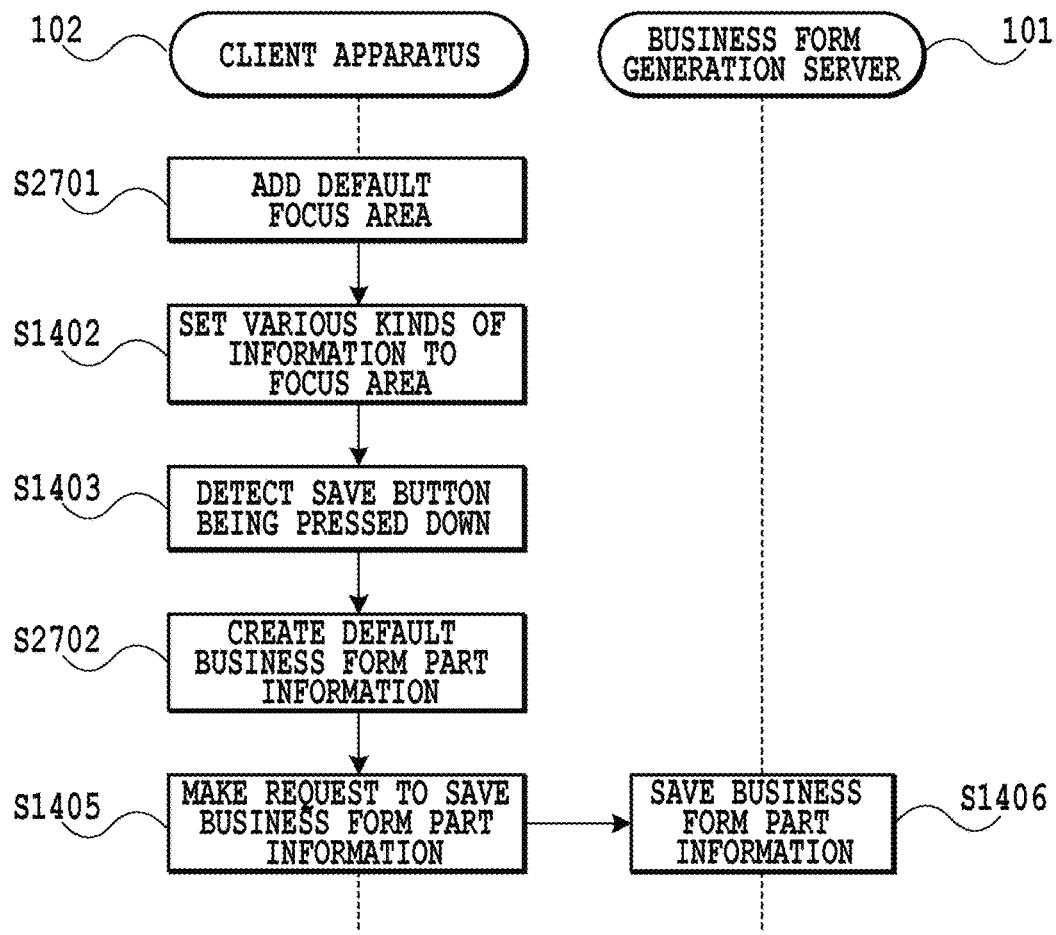
FIG. 27 is a diagram showing a saving flow of business form part information of a third embodiment.

FIG. 27 shows a flowchart of processing at the time of business form part saving on the Web form editing screen in the present embodiment. Basically, the flow is the same as the flow explained with reference to FIG. 14 in the first embodiment. Consequently, in the following, a comparison with the first embodiment is made and only different portions are explained.

At step S2701, the client apparatus 102 adds a focus area as a default business form part in accordance with instructions of a user. Specific contents are explained with reference to FIG. 28, to be shown later.

Figure 28:
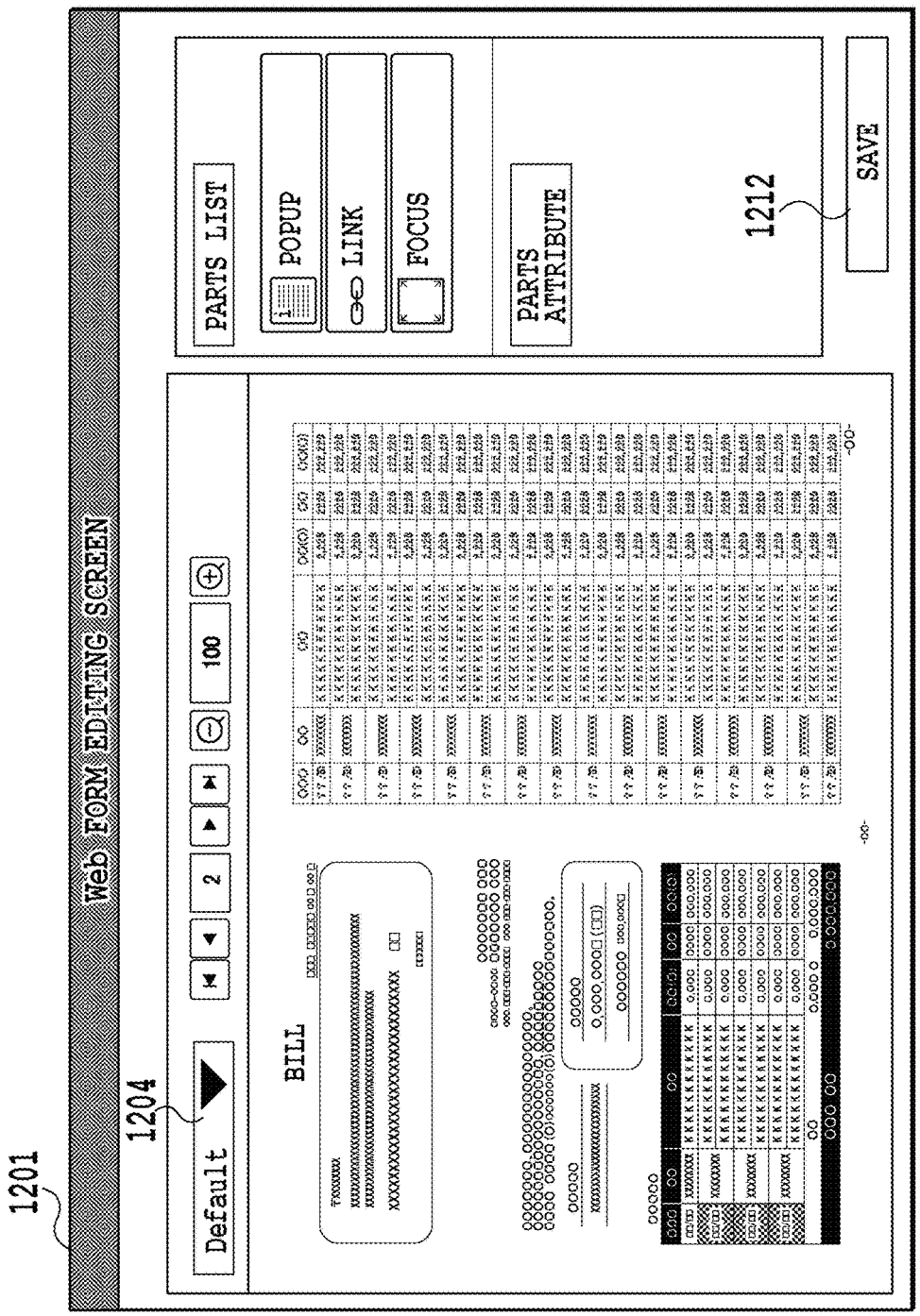
FIG. 28 is a diagram showing an example of a Web form editing screen of the third embodiment.

FIG. 28 shows an example of the Web form editing screen in the present embodiment. The Web form editing screen shown in FIG. 28 is a screen similar to Web form editing screen 1201 shown in FIG. 12, but the configuration differs in that "Default" can be selected by operating the arrangement-target selection dropdown list 1204. "Default" means that the target in which a focus area is arranged is a face in which any other business form part is not arranged. In the present embodiment, a user selects "Default" by operating the arrangement-target selection dropdown list 1204 and gives instructions to arrange a default business form part. After this, a user gives instructions to save a focus area by adding the focus area and pressing down the Save button 1212.

Returning to FIG. 27, at step S2702, the client apparatus 102 generates business form part information including a default business form part. Specific contents are explained with reference to FIG. 29, to be shown later.

Figure 29:
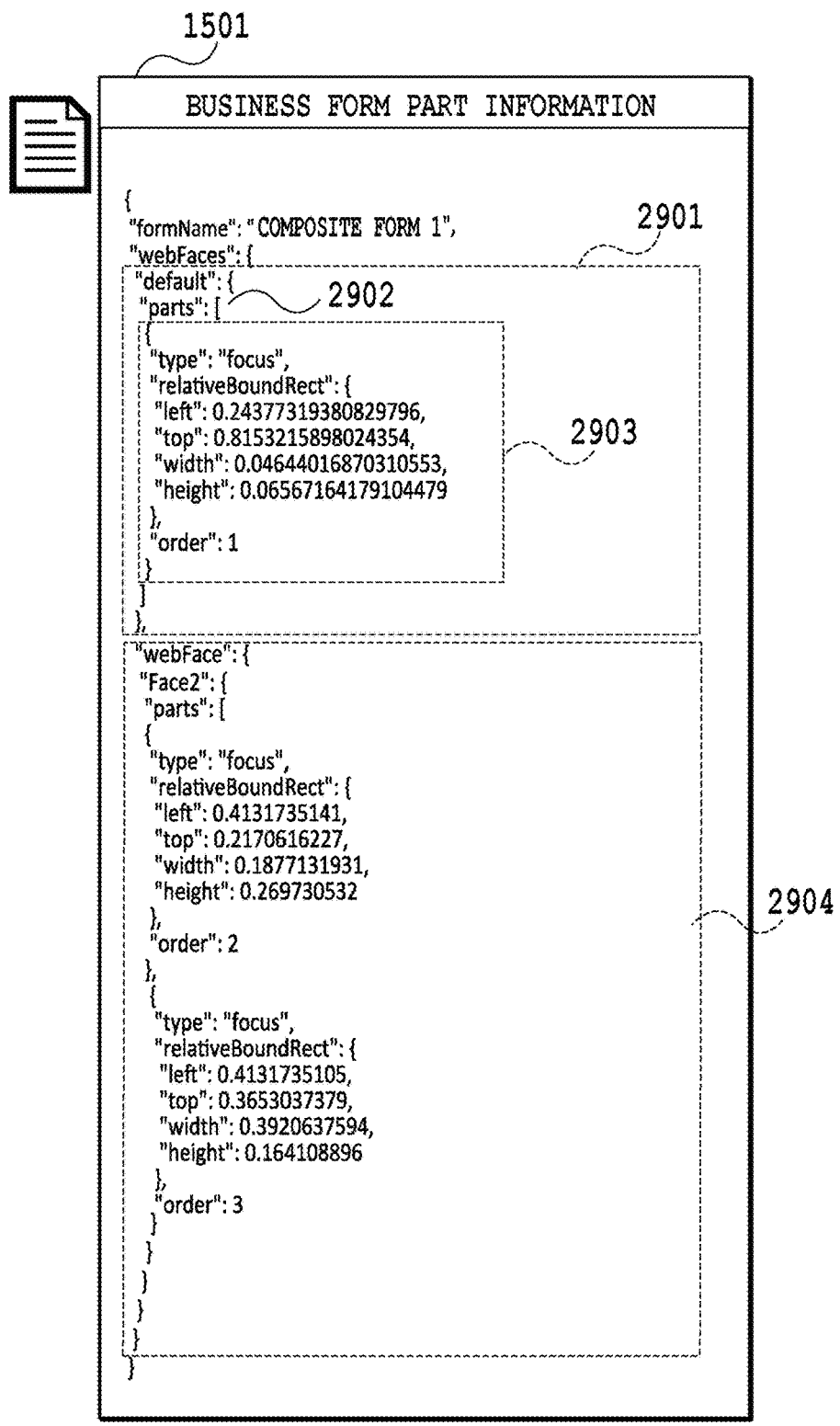
FIG. 29 is a diagram showing an example of the business form part information of the third embodiment.

FIG. 29 shows an example of the business form part information including a default business form part in the present embodiment. The business form part information shown in FIG. 29 has a configuration similar to that of the business form part information 1501 shown in FIG. 15, and here, different portions are explained.

The business form part information 1501 in the present embodiment includes a block 2091 labeled as "default". The block 2901 labeled as "default" is the portion storing information on a default business form part. After a "parts" block 2902, a list of default business form parts is shown. In this example, only one part is shown, but it is possible for the "parts" block 2902 to store a plurality of parts. Each part is represented by a block 2903. In this example, one focus area is stored. In this example, not only the "default" block 2901 but also a portion 2904 storing the business form part for each face is stored in the same file. To explain more specifically, in the portion 2504 storing the business form part for each face, two business form parts for "Face2" are included. Consequently, the default business form part included in the block 2901 labeled as "default" is neither arranged nor displayed on the business form page corresponding to "Face2".

One or more default business form parts and one or more business form parts set in the individual face are not arranged on the same business form page, and therefore, as a matter of course, both transition orders are independent of each other.

Figure 30:
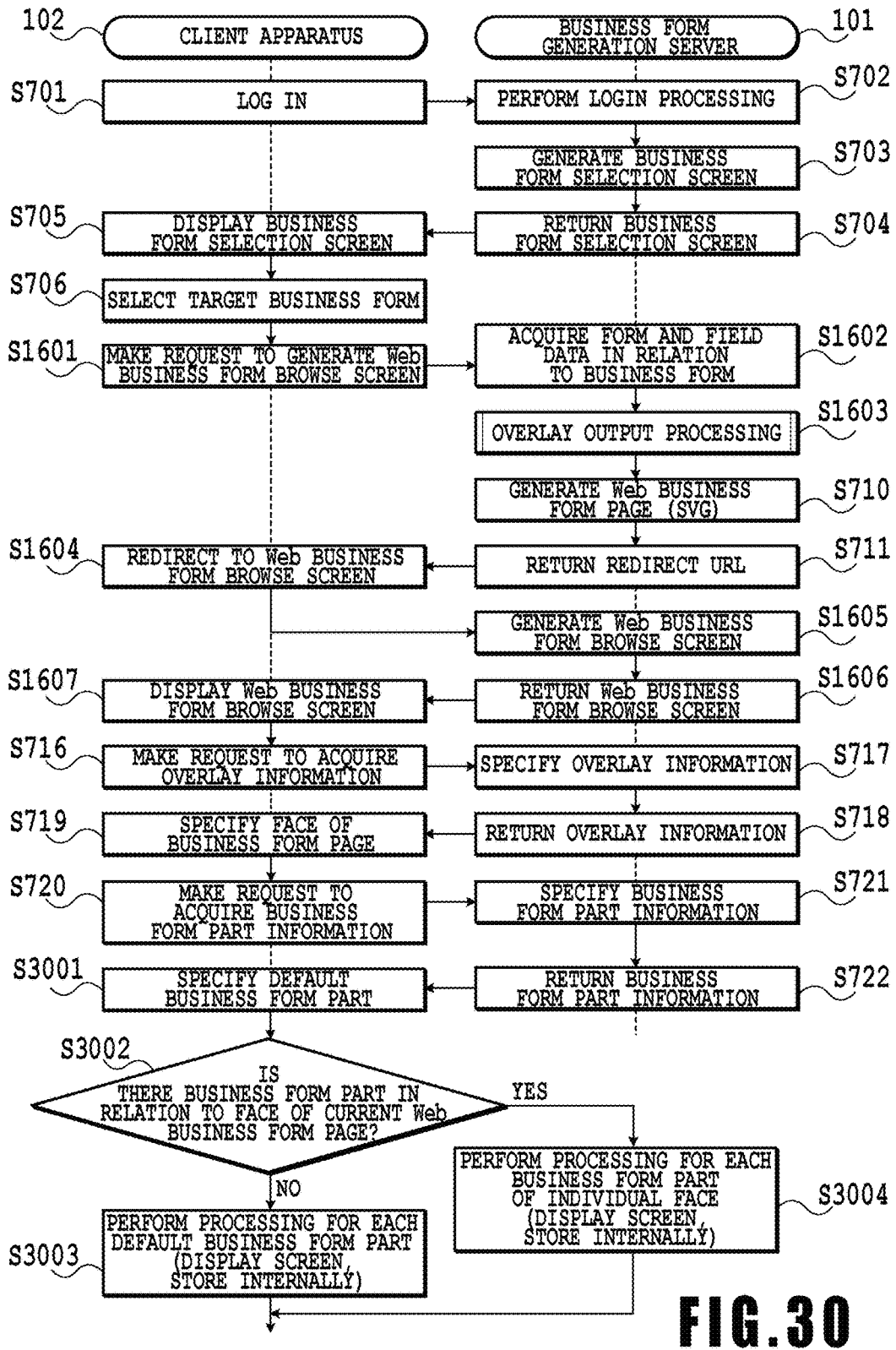
FIG. 30 is a diagram showing a sequence of processing to generate a Web business form browse screen of the third embodiment.

FIG. 30 shows a sequence of the Web business form browse screen generation processing in the present embodiment. Basically, the flow is same as the flow of the Web business form browse screen generation processing described above with reference to FIG. 16. Consequently, in the following, only portions different from the sequence shown in FIG. 16 are explained.

At step S3001, the client apparatus 102 specifies the default business form part based on the business form part information received from the business form generation server 101. Specifically, the client apparatus 102 specifies the default business form part by making a search to check whether the "default" block 2901 exists in the business form part information acquired at the previous step.

At step S3002, the client apparatus 102 determines whether there is a business form part in relation to the face of the business form page currently being displayed. That is, the client apparatus 102 determines whether there is a business form part other than the default business form part. In the case where there is another business form part, the processing advances to step S3004.

At step S3004, the client apparatus 102 specifies the business form part unique to each face and performs processing for each business form part of the individual face. The contents thereof are the same as those explained at step S1608.

On the other hand, in the case where there is not another business form part, the processing advances to step S3003. At step S3003, the client apparatus 102 performs processing for each default business form part. The contents thereof are the same as those explained at step S1608. In this case, there is no business form part unique to each face, and therefore, only the processing of the default business form part is performed.

In the present embodiment, by setting the default business form part and making it possible to arrange the default business form part, the convenience of business form part arrangement for the faces of the basic case and the individual case, respectively, is improved. For example, there is a case where it is desired to specify a header as a focus area on a business form page on which there is a header as the basic case and there is no header as an exception (individual case) on the business form page made up of a composite form. In such a case, by defining a focus area in the header as the default business form part and by defining a focus area unique to the face in the face of the individual case, it is made possible to reduce time and effort to arrange the business form part.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to provide a server apparatus, a client apparatus, an information processing method, and a storage medium storing a program, which can improve convenience of a user while suppressing an increase of the load to enlarge a specific area within a business form page.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-212171 filed Oct. 28, 2016, which is hereby incorporated by reference wherein in its entirety.

What is claimed is:

1. A server apparatus comprising:
a memory that stores a program; and
a processor that executes the program to perform:
generating a business form page by overlaying field data and a form that is selected by a user of a client apparatus;
generating a web form editing program which is run on a web browser of the client apparatus, wherein the generated web form editing program includes data of an editing screen, the generated business form page, and a first script program for controlling editing operations of the business form page;
transmitting the generated web form editing program to the client apparatus, wherein the web browser of the client apparatus executes the web form editing program to display the editing screen, wherein the editing screen edits the business form page by arranging parts on the business form page based on an instruction of the user of the client apparatus, and wherein the arranged parts include a focus part that defines a focus area to enlarge a specific area within the business form page;
receiving, from the client apparatus, business form part information of the parts arranged on the business form page, wherein the received business form part information includes information of the focus area that is defined by the focus part;
saving the received business form part information associated with the form;
generating a web form browse program which is run on the web browser of the client apparatus, wherein the generated web form browse program includes data of a browsing screen, a generated business form page, the information of the focus area, and a second script program for controlling browsing operations of the business form page; and
transmitting the generated web form browse program to the client apparatus, wherein the web browser of the client apparatus executes the web form browse program to display the browsing screen, wherein the browsing screen browses the business form page, and wherein the specific area of the browsed business form page is enlarged based on the information of the focus area.

2. The server apparatus according to claim 1, wherein the specific area is enlarged in a case where instructions to move into a focus mode are detected on the client apparatus that displays the business form page.

3. The server apparatus according to claim 2, wherein the instructions to move into a focus mode are detected by a gesture input on the client apparatus that displays the business form page.

4. The server apparatus according to claim 1, wherein the information on a focus area includes a transition order of the focus area on the client apparatus that displays the business form page and in a case where focus transition instructions are detected on the client apparatus that displays the business form page, a transition is made into a next focus area in accordance with the transition order.

5. The server apparatus according to claim 4, wherein the focus transition instructions are detected by a gesture input on the client apparatus that displays the business form page.

6. The server apparatus according to claim 1, wherein the information on a focus area includes a position and a size on the business form page.

7. The server apparatus according to claim 1, wherein the information on a focus area is saved individually for the business form page on which a focus area is specified.

8. The server apparatus according to claim 1, wherein information on a focus area is saved as business form part information valid for all the business form pages.

9. The server apparatus according to claim 1, wherein the information on a focus area is saved as business form part information valid for a business form page on which another piece of business form part information is not specified.

10. An information processing method in a server apparatus, the method comprising the steps of:
generating a business form page by overlaying field data and a form that is selected by a user of a client apparatus;
generating a web form editing program which is run on a web browser of the client apparatus, wherein the generated web form editing program includes data of an editing screen, the generated business form page, and a first script program for controlling editing operations of the business form page;
transmitting the generated web form editing program to the client apparatus, wherein the web browser of the client apparatus executes the web form editing program to display the editing screen, wherein the editing screen edits the business form page by arranging parts on the business form page based on an instruction of the user of the client apparatus, and wherein the arranged parts include a focus part that defines a focus area to enlarge a specific area within the business form page;
receiving, from the client apparatus, business form part information of the parts arranged on the business form page, wherein the received business form part information includes information of the focus area that is defined by the focus part;
saving the received business form part information associated with the form;
generating a web form browse program which is run on the web browser of the client apparatus, wherein the generated web form browse program includes data of a browsing screen, a generated business form page, the information of the focus area, and a second script program for controlling browsing operations of the business form page; and transmitting the generated web form browse program to the client apparatus, wherein the web browser of the client apparatus executes the web form browse program to display the browsing screen, wherein the browsing screen browses the business form page, and wherein the specific area of the browsed business form page is enlarged based on the information of the focus area.

11. A non-transitory computer readable storage medium storing a program for causing a computer to perform an information processing method in a server apparatus, the method comprising the steps of:

generating a business form page by overlaying field data and a form that is selected by a user of a client apparatus;

generating a web form editing program which is run on a web browser of the client apparatus, wherein the generated web form editing program includes data of an editing screen, the generated business form page, and a first script program for controlling editing operations of the business form page;

transmitting the generated web form editing program to the client apparatus, wherein the web browser of the client apparatus executes the web form editing program to display the editing screen, wherein the editing screen edits the business form page by arranging parts on the business form page based on an instruction of the user of the client apparatus, and wherein the arranged parts include a focus part that defines a focus area to enlarge a specific area within the business form page;

receiving, from the client apparatus, business form part information of the parts arranged on the business form page, wherein the received business form part information includes information of the focus area that is defined by the focus part;

saving the received business form part information associated with the form;

generating a web form browse program which is run on the web browser of the client apparatus, wherein the generated web form browse program includes data of a browsing screen, a generated business form page, the information of the focus area, and a second script program for controlling browsing operations of the business form page; and transmitting the generated web form browse program to the client apparatus, wherein the web browser of the client apparatus executes the web form browse program to display the browsing screen, wherein the browsing screen browses the business form page, and wherein the specific area of the browsed business form page is enlarged based on the information of the focus area.

* * * * *